United States Patent
Kawara

(10) Patent No.: US 8,208,162 B2
(45) Date of Patent: Jun. 26, 2012

(54) VARIABLE PAGE PRINTING SYSTEM

(75) Inventor: Satoshi Kawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 12/265,713

(22) Filed: Nov. 5, 2008

(65) Prior Publication Data

US 2009/0116064 A1 May 7, 2009

(30) Foreign Application Priority Data

Nov. 7, 2007 (JP) ................................. 2007-289956

(51) Int. Cl.
*G06F 3/12* (2006.01)
(52) U.S. Cl. ........ 358/1.15; 358/1.9; 358/442; 709/218; 379/100.17
(58) Field of Classification Search .................. 358/1.15, 358/1.9, 3.28, 1.16, 442, 402; 709/228, 218; 379/100.17, 93, 32, 31
See application file for complete search history.

(56) References Cited

U.S. PATENT DOCUMENTS

| | | | | |
|---|---|---|---|---|
| 5,923,013 A * | 7/1999 | Suzuki et al. | .................. | 235/375 |
| 6,315,379 B1 * | 11/2001 | Adams et al. | .................... | 347/14 |
| 6,873,348 B1 * | 3/2005 | Isono et al. | .................... | 347/213 |
| 7,456,990 B2 * | 11/2008 | Gauthier | ...................... | 358/1.15 |
| 7,920,291 B2 * | 4/2011 | Fukada et al. | .................. | 358/2.1 |
| 7,999,960 B2 * | 8/2011 | Kadoi et al. | .................. | 358/1.15 |
| 2003/0107777 A1 * | 6/2003 | Yamade et al. | ................ | 358/442 |
| 2004/0041856 A1 * | 3/2004 | Im et al. | ............................ | 347/7 |
| 2005/0052524 A1 * | 3/2005 | Isono et al. | .................... | 347/217 |
| 2006/0279814 A1 * | 12/2006 | Fukada et al. | ................ | 358/540 |
| 2008/0137114 A1 * | 6/2008 | Sanami | ........................... | 358/1.9 |
| 2008/0180713 A1 * | 7/2008 | Kodera | ........................... | 358/1.13 |
| 2008/0204819 A1 * | 8/2008 | Chiba | ........................... | 358/452 |
| 2008/0285072 A1 * | 11/2008 | Niwa et al. | .................... | 358/1.15 |
| 2011/0149318 A1 * | 6/2011 | Fukada et al. | ................ | 358/1.9 |

FOREIGN PATENT DOCUMENTS

JP 6-180662 6/1994

\* cited by examiner

*Primary Examiner* — Negussie Worku
(74) *Attorney, Agent, or Firm* — Fitzpatrick, Cella, Harper & Scinto

(57) ABSTRACT

The present invention relates to an image processing device that can implement printing (both printing of variable pages and non-variable pages) of an entire document and printing of only variable pages in a simplified manner. The device includes a selecting unit, a determining unit, and outputting unit. The selecting unit selects a printing mode. The determining unit determines whether the selected printing mode is an ordinary printing mode or a variable page printing mode. The outputting unit outputs printing data for a variable page and a non-variable page when the selected printing mode is determined to be the ordinary printing mode the determining unit, and outputs printing data for the variable page when the selected printing mode is determined to be the variable page printing mode by the determining unit.

6 Claims, 30 Drawing Sheets

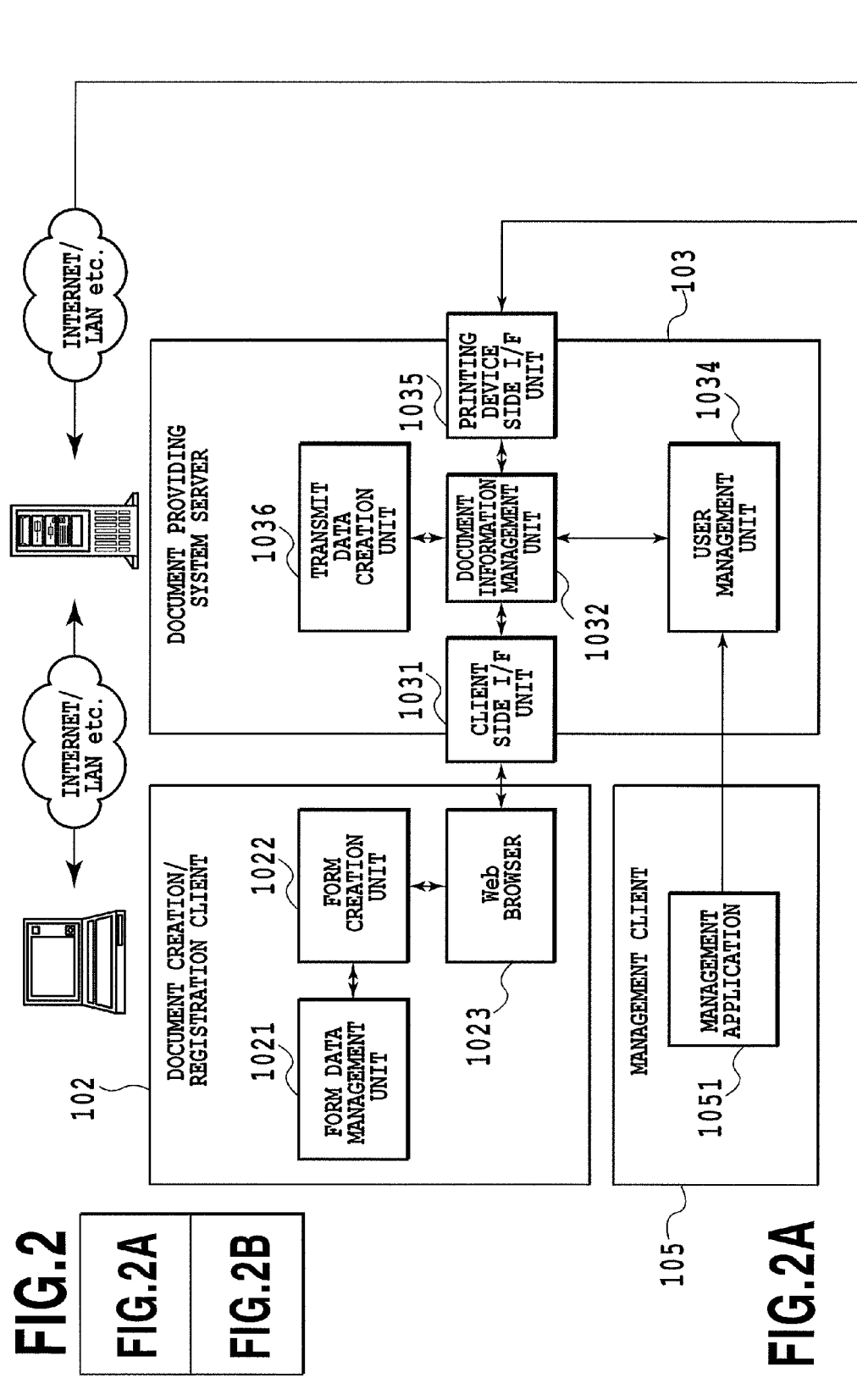

Web BROWSER http://· · · · · · · · · · · · · · · · · · · · ·

DESIGNATE DETAILED SETTING OF DOCUMENT

| PRINT SIZE | ● A3 ○ A4 ○ B3 ○ B5 ○ Letter |
| PRINT SIDE | ● SINGLE-SIDED ○ BOTH-SIDED |
| PAGE LAYOUT | ● 1 PAGE/FLAT ○ 2 PAGES/FLAT ○ 4 PAGES/FLAT |
| COLOR/MONOCHROME | ● COLOR ○ MONOCHROME |

☐ CHANGE IN STYLE WHEN PRINTING SHALL NOT BE PERMITTED
■ SET A PASSWORD TO A DOCUMENT
PASSWORD [●●●●]
CONFIRM INPUT [●●●●]

[← BACK]  [→ NEXT]

FIG.6

| FILE NAME | DATE OF RECEIPT OF MANUSCRIPT |
|---|---|
| INSURANCE PLAN_SUZUKI | 2006/06/30 |
| INSURANCE PLAN_TANAKA | 2006/06/30 |
| INSURANCE PLAN_SATO | 2006/06/30 |

DOCUMENT LIST

DETAILED INFORMATION

LOGOUT  ← BACK  NEXT →

FIG.13

| |
|---|
| DOCUMENT INFORMATION |
| DOCUMENT ID |
| DOCUMENT NAME |
| REGISTERED USER ID |
| JOB TICKET |
| DOCUMENT FILE REFERENCE INFORMATION |
| VARIABLE PAGE INFORMATION |

FIG.15

| VARIABLE PAGE INFORMATION ||
|---|---|
| PAGE NO | VARIABLE/NON-VARIABLE FIELD |
| 1 | NON-VARIABLE PAGE |
| 2 | VARIABLE PAGE |
| 3 | NON-VARIABLE PAGE |
| 4 | VARIABLE PAGE |
| 5 | NON-VARIABLE PAGE |
| 6 | NON-VARIABLE PAGE |

FIG.16

| USER INFORMATION |
|---|
| USER ID |
| LOGIN ID |
| LOGIN PASSWORD |
| JOB TICKET FOR USER |

FIG.17

```
1 <JobTicket>
2   <Process = Print>
3       < Type = "DOCUMENT TO BE PRINTED ">
4           < Document = "Original.doc"/>
5       </Type>
6       < Type = "PAGES TO BE PRINTED ">
7           < PrintPage = " 1-8"/>
8       </Type>
9       < Type = "SHEET SIZE ">
10          < Size = "A4"/>
11      </Type>
12      < Type = "PRINTING METHOD ">
13          < PrintMethod = " BINDING "/>
14      </Type>
15      < Type = "COLOR MODE ">
16          < ColorMode = "Color" />
17      </Type>
18  </Process>
19 </JobTicket>
```

FIG.19

```
1  <JobTicket>
2    <Process = Print>
3        < Type ="DOCUMENT TO BE PRINTED">
4            < Document = "Original.doc"/>
5        </Type>
6        < Type ="PAGES TO BE PRINTED">
7            < PrintPage = "Valiable_Page"/>
8             <Valiable_Page = "Valiavle_PageInfo.file">
8        </Type>
10       < Type ="SHEET SIZE">
11           < Size = "A4"/>
12       </Type>
13       < Type =" PRINTING METHOD">
14           < PrintMethod= "SHIMOMARUKO HANAKO"/>
15       </Type>
16       < Type ="COLOR MODE">
17           < ColorMode= "Color"/>
18       </Type>
19    </Process>
20 </JobTicket>
```

FIG.20

| FIELD DATA INFORMATION | |
|---|---|
| FIELD DATA ID | FIELD DATA |
| 1 | YAMADA TARO |
| 2 | 2000 |
| 3 | 14000 |
| 4 | 15200 |
| 5 | SHIMOMARUKO HANAKO |
| ⋮ | ⋮ |

PLAN-A ESTIMATE SHEET

TO: YAMADA TARO

PRICE FOR ◯◯         2000 YEN

PRICE FOR ◯◯        14000 YEN

........ ........ ........

TOTAL SUM   152000 YEN

FEATURES OF PLAN-A
........ ........ ........
........ ........ ........

HOW TO SEE ESTIMATE SHEET
........ ........ ........
........ ........ ........

CAUTIONS
........ ........ ........
........ ........ ........

PERSON IN    SHIMOMARUKO HANAKO
CHARGE

| FIELD DATA INFORMATION | | |
| --- | --- | --- |
| FIELD DATA ID | FIELD DATA | FIELD DATA LEVEL |
| 1 | YAMADA TARO | HIGH |
| 2 | 2000 | HIGH |
| 3 | 14000 | HIGH |
| 4 | 15200 | HIGH |
| 5 | SHIMOMARUKO HANAKO | LOW |
| ... | ... | ... |

FIG.29

VARIABLE PAGE PRINTING SYSTEM

BACKGROUND OF THE INVENTION

1. Field of the Invention

The present invention relates to a system and method for printing document data, more specifically, to an apparatus, system and method for selectively printing the whole or a part of document data depending on characteristics of the document data.

2. Description of the Related Art

There exists a printing system in the form that a printing device, such as MFP (Multifunction Peripheral) or the like receives document data from a personal computer through a network, such as LAN, etc., and prints it. In addition, there exists a printing system in the form in which a user selects out of a plurality of pieces of document data that have been registered in advance in a document registration server, the document data to be printed, while the printing device receives the document data that the user has selected from the document registration server and prints it.

When printing a document using these printing systems, a user may desire to print all pages of the document, or may desire to print only particular pages of the document. Further, even in a case in which the same document is to be printed, the user may desire to change a printing style (color binding printing, monochrome 2UP printing, etc.) of the document depending on the applications of the document.

As a method for printing only particular pages in a document, there is commonly known a technique to print particular pages of which page numbers are designated by a user (hereinafter referred to as "conventional technique 1").

Further, another technique to add particular character data or particular image data to the pages to be printed when registering document data, and then to print only the pages in which these pieces of data are detected when printing (hereinafter referred to as "conventional technique 2"), is disclosed in Japanese Patent Laid-Open No. 06-180662 (1994). According to this technique, since the need for a user to designate the page numbers for each printing is eliminated, the user can print only necessary pages easily and quickly.

Additionally, there is known a technique to retain job tickets in a plurality of types, or create documents themselves in a plurality of types, and to register in a document registration server (hereinafter referred to as "conventional technique 3"), in a case in which the same documents are printed in different printing styles depending on their applications, or in a case in which only necessary pages are printed. Note that, by a job ticket, we mean a document in which print setting information, such as both sides printing, printing with finish binding, for example, is described.

On the other hand, there is also known a technique to generate automatically a billing, a kind of a form document (hereinafter referred to as "conventional technique 4"). For example, there is known a technique to merge a form file of billing (form template that indicates layout and fixed data of form) and field data using library, to create an output form of billing (Refer to FIG. 28). According to this technique, a billing for printing can be generated by inserting field data (for example, different amounts of money and names, etc. from customer to customer) into a predetermined field graphics in the form file of billing.

As described above, in printing of papers, such as form documents, there are cases where users may desire to print all pages of papers, and may desire to print only a certain pages. To take an insurance business by insurance salespersons as an example, when insurance salespersons make arrangements with a customer, they usually create estimate sheets in two copies. One copy is for the customer, another one copy is for the Principal. The estimate sheets in two copies, however, need not be necessarily of the same printing format. For example, the pages on which general contents including covenant and caution notes of insurance are described need to be included in the estimate sheet for the customer, but they do not need to be included in the estimate sheet for the Principal. This is because insurance salespersons who are specialists of insurance are thoroughly familiar with the general contents, and thus they need not to read such pages. That is, the estimate sheets for insurance salespersons are in no need of the pages on which general contents are described, and papers containing only the pages on which pieces of customer information including names, contract contents, estimate contents, etc. are described will be sufficed. In the following description, the pages on which the customer information, and the like are described are referred to as "variable pages", whereas the pages on which general contents are described are referred to as "non-variable pages".

Further, it is effective to enhance the appearance of estimate sheets for customers with binding and color representations, but estimate sheets for Principal in a simplified printing (for example, monochrome printing, non-binding) will be sufficed, and this is rather desirable since it can bring printing costs in line. Further, it is desirable that estimate sheets for insurance salespersons contain only variable pages picked out from the estimate sheets for customers for a plurality of customers whom insurance salespersons plan to visit on that day, which are then brought together in one set (Refer to FIGS. 24 to 27).

But, when printing of estimate sheets for customers (printing of both variable pages and non-variable pages) and printing of estimate sheets for insurance salespersons (printing of only variable pages) are performed, using the above-mentioned conventional technique, there arise the following problems.

In the conventional technique 1, when printing only a portion of discrete pages out of one document, once a user has to bring the entire document into view on a display, and then to designate a portion of pages on page-by-page basis, resulting in less efficiency, and also a great burden to the user.

In the conventional technique 2, when registering document data, it is needed for a user to set in advance particular character data and particular image data added to the pages that are scheduled to be printed, which will be a significant burden to the user.

In the conventional technique 3, a job ticket (print setting information) and a printing document itself have to be created and retained in a plurality of copies, which will put a significant burden upon a user, and remarkably increase the volume of data to be processed.

In the conventional technique 4, since a form document created from a form file and field data is a general-purpose file format such as PDF, etc., it is impossible to recognize which data in the form document after having been created was field data. That is, the same variable pages are contained in estimate sheets for customers and estimate sheets for salespersons, but in the conventional technique 4, it is impossible to recognize which pages are variable pages. Therefore, with respect to the same variable pages, a processing to convert them to a printer code that can be interpreted by the printer will have to be executed twice. This causes printing performance to deteriorate.

SUMMARY OF THE INVENTION

The purpose of the present invention is to provide a system that can implement printing of the entire document (printing of both variable pages and non-variable pages) and printing of only variable pages in a simplified manner.

A device according to the present invention includes an inputting component for inputting instructions for printing variable pages in a document, and a printing component for printing, when instructions for printing variable pages have been input, the data of variable pages in the document.

A system according to the present invention includes a document creating component for creating document data corresponding to a document, and variable page information indicating whether or not pages contained in the document are variable pages on page-by-page basis; a document registering component for registering document data and variable page information in association with each other; and a printing component that can execute printing of document data and printing of variable pages. The document registering component analyzes, when accepting instructions for printing variable pages in the document, the variable page information associated with the document data corresponding to the document, and transmits the data of the variable pages in the document to the printing component.

A method according to the present invention is a printing method used in a printing system including a document creating component, a document registering component, and a printing component. The document creating component creates document data corresponding to a document, and variable pages information indicating whether the pages contained in the document are variable pages or not on page-by-page basis. The document registering component registers document data and variable pages information in association with each other, and analyzes, when accepting instructions for printing variable pages in the document, variable page information associated with the document data corresponding to the document, and transmits the data of the variable pages in the document to the printing component. The printing component performs either one or the both of printing of document data and printing of variable pages.

A computer-readable recording medium according to the present invention records a computer program for causing a computer to perform the above method.

An image processing device according to the present invention includes a selecting component, a determining component, and an outputting component. The selecting component is configured to select a printing mode. The determining component is configured to determine whether the selected printing mode is an ordinary printing mode or a variable page printing mode. The outputting component is configured to output printing data for a variable page and a non-variable page when the selected printing mode is determined to be the ordinary printing mode as a result of the determination by the determining component, and configured to output printing data for the variable page when the selected printing mode is determined to be the variable page printing mode as a result of the result of the determination by the determining component.

An image processing method according to the present invention includes the steps of selecting, determining, and outputting. The selecting step includes selecting a printing mode. The determining step includes determining whether the selected printing mode is an ordinary printing mode or a variable page printing mode. The outputting step includes outputting printing data for a variable page and a non-variable page when the selected printing mode is determined to be the ordinary printing mode as a result of the determination by the determining step, and outputting printing data for the variable page when the selected printing mode is determined to be the variable page printing mode as a result of the result of the determination by the determining step.

A computer-readable recording medium according to the present invention records a computer program for causing a computer to perform the above image processing method.

According to the present invention, printing (for example, printing of documents for insurance salespersons) of only variable pages can be performed in a simplified manner.

According to the present invention, when the both of printing of the entire document and printing of only variable pages are performed, there is no need for creating two or more kinds of data in advance, which in turn puts little burden upon users.

According to the present invention, when only variable pages are subjected to printing after the entire document has been printed, a printing device stores variable pages for a while in a memory during the process of the print processing of the entire document, so that the printing of only variable pages can be performed at a high speed after the entire document has been printed.

According to the present invention, when only variable pages are subjected to printing, only the data of variable pages is transmitted to the printing device, so that a transmit load of communication channel can be reduced.

Further features of the present invention will become apparent from the following description of exemplary embodiments (with reference to the attached drawings).

BRIEF DESCRIPTION OF THE DRAWINGS

FIG. 2 is a diagram illustrating the relationship of FIGS. 2A and 2B;

FIG. 2A is a block diagram illustrating the details of configuration example of devices provided in a printing system according to the present embodiment;

FIG. 6 is a view illustrating an example of a document attribute information designation screen displayed in a WEB browser;

FIG. 13 is a view illustrating an example of dialog box of document list displayed on an operation panel;

FIG. 15 is a view illustrating an example of a document information management table stored in a document information management unit;

FIG. 16 is a view illustrating an example of variable page information created by the form creation unit, and managed by the document information management unit;

FIG. 17 is a view illustrating an example of a user information management table stored in a user management unit;

FIG. 19 is a view illustrating an example of a job ticket analyzed by a job ticket/document analyzing unit;

FIG. 20 is a view illustrating an example of a job ticket containing variable page information;

FIG. 21 is a view illustrating an example of a field data information management table stored in a form data management unit;

FIG. 23 is a view illustrating an example of a form created by the form creation unit;

FIG. 29 is a view illustrating field data information.

DESCRIPTION OF THE EMBODIMENTS

The embodiments of the present invention will be described with reference to drawings.

<Configuration Example of Printing System>

Figure 1:
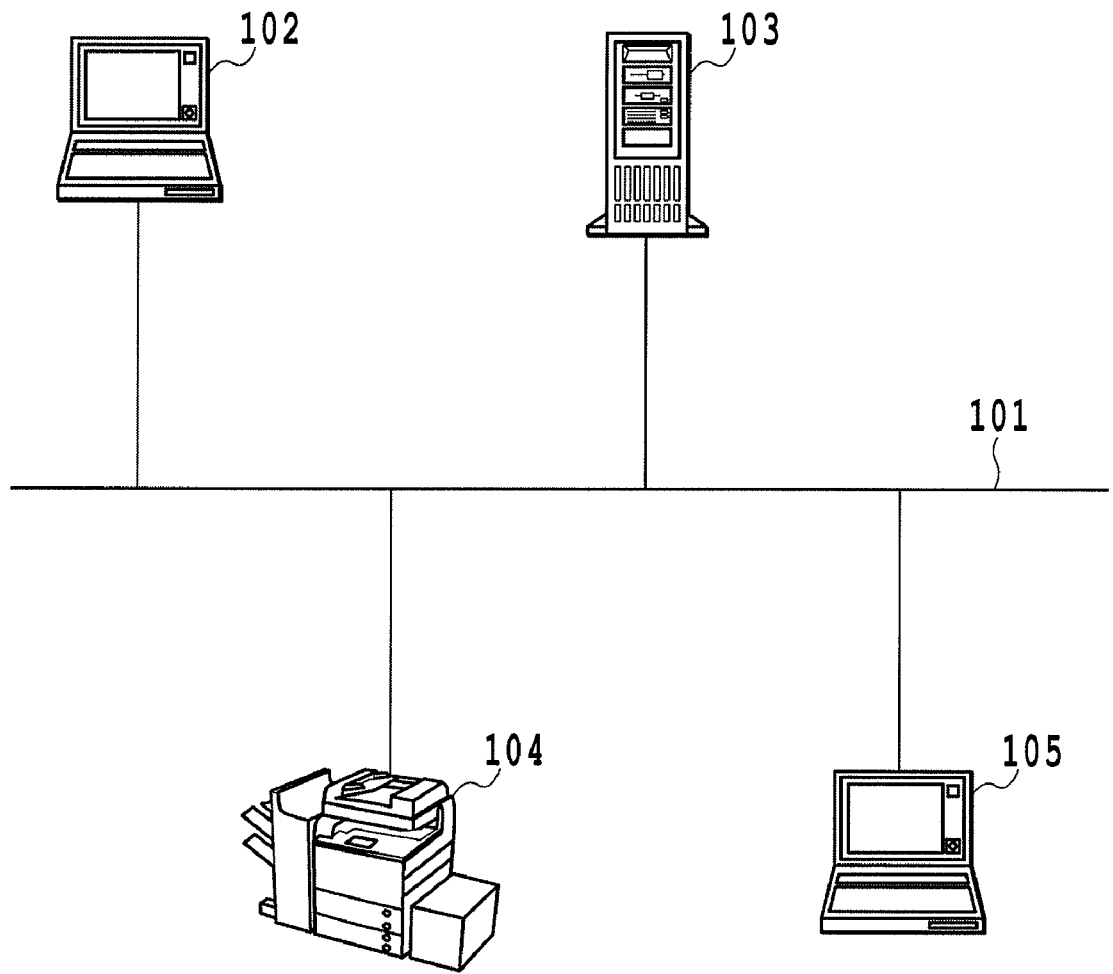
FIG. 1 is a block diagram illustrating the outline of configuration example of a printing system according to the present embodiment.

FIG. 1 is a block diagram illustrating the outline of configuration example of a printing system according to the present embodiment.

The printing system includes a document creation/registration client 102, a document providing system server 103, a printing device 104, and a management client 105. The document creation/registration client 102, the document providing system server 103, the management client 105, that are among information processing devices, can execute various programs, such as application programs, and the like. Further, the printing device 104 has also information processing function, and can execute various programs, such as application programs, and the like. The document registration client computer 102, the document providing system server 103, the printing device 104, the management client 105 are connected with one another via a network 101, such as LAN, WAN, Internet, etc., thus enabling communication with one another.

The printing device 104 receives electronic documents, PDL encoded printing data, job tickets (print setting information) from respective information processing devices via the network 101, and stores them in a self-contained memory. Printing data includes printing information comprised of character codes, images, control codes, and the like. Then, the printing device 104 reads out printing data from the memory, creates character patterns, print images, etc. in accordance with the printing data, and prints them on printing paper.

Note that, in the present embodiment, when the printing device 104 does not have information processing function, a printing control computer (not shown) having information processing function may be further provided. In this case, the printing control computer accepts document printing instructions from a user, communicates with the document providing system server 103, and controls over the printing device 104.

The document providing system server 103 is an information processing device for managing user information, document information, printing device information. Document information, for example, includes a person who created document, a document ID, a document name, and a job ticket. Such information can be referred to from other devices. The document providing system server 103 is also loaded with an application program for creating document data. In addition, the document providing system server 103 may have a Web server function. In this case, the document creation/registration client 102 or the management client 105 can get access to the document providing system server 103 by use of a WEB browser function. Note that, the document creation/registration client 102, the printing device 104, the management client 105 may be configured to get access from a specialized application that is loaded on each device to the document providing system server 103 by use of a communication protocol, such as TCP/IP or HTTP, or the like.

The document creation/registration client 102 is an information processing device for creating a document to be printed, such as a form document, etc., and registering it in the document providing system server 103. A user creates a document to be printed by use of the document creation/registration client 102. Then, the document creation/registration client 102 registers the document information and document file of a document to be printed in the document providing system server 103 via the network 101.

A user operates an operation panel of the printing device 104 to refer to the document information registered in the document providing system server 103, and downloads necessary data from the document providing system server 103 to the printing device 104 to perform a printing work.

The management client 105 is an information processing device that performs the management of jobs of the entire printing system.

Figure 2B:
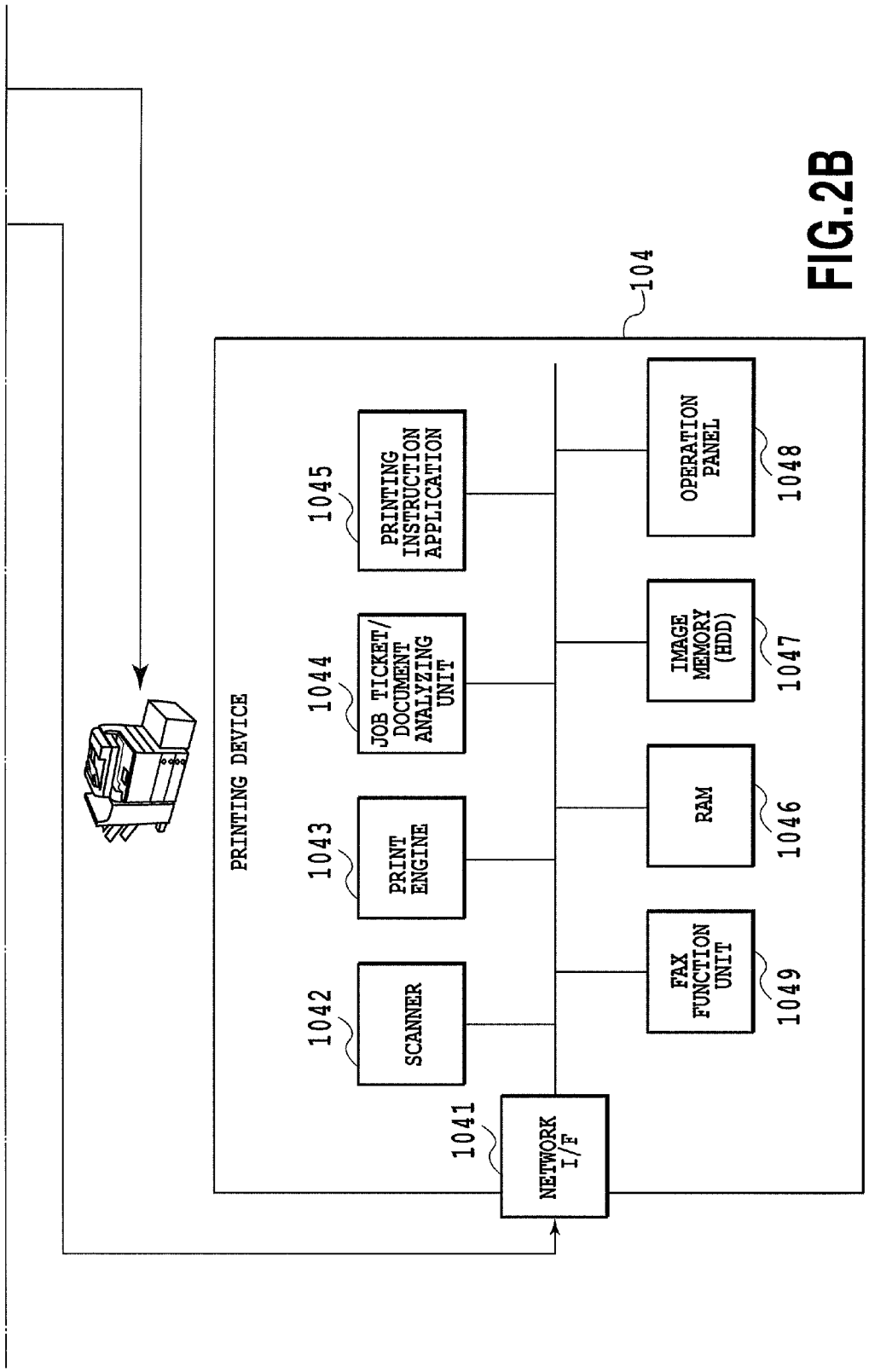
FIG. 2B is a block diagram illustrating the details of configuration example of devices provided in a printing system according to the present embodiment.

FIG. 2A and FIG. 2B are block diagrams illustrating the details of configuration example of respective devices as described above.

The document creation/registration client 102 includes a form data management unit 1021, a form creation unit 1022, and a WEB browser 1023.

The form data management unit 1021 stores, manages a form template and field data for creating form. The form creation unit 1022 creates various form and variable pages information utilizing the form template and the field data that are managed by the form data management unit 1021. The WEB browser 1023 is a WEB browser that operates on the document creation/registration client 102. Note that the details of variable page information will be described later.

The document providing system server 103 includes a client side I/F unit 1031, a document information management unit 1032, a user management unit 1034, a printing device side I/F unit 1035, and a transmit data creation unit 1036. The client side I/F unit 1031 is an interface unit that processes the communication with the document providing system server 103. The client side I/F unit 1031 has a function of Web server, and accepts a request by HTTP, HTTPS from the document creation/registration client 102. The document information management unit 1032 stores, manages variable page information, document information including a job ticket, a document file as a set in association with a user ID. The user management unit 1034 manages user information and printing device information. The printing device side I/F 1035 is an interface unit that processes the communication with the printing device 104. The printing device side I/F unit 1035 has a function of a Web server, and accepts a request by HTTP, HTTPS from the printing device 104. The transmit data creation unit 1036 analyzes variable page information, and performs the creating process of the document data that is to be sent to the printing device 104.

The printing device 104 includes a network I/F unit 1041, a scanner 1042, a print engine 1043, and a job ticket/document analyzing unit 1044. Further, the printing device 104 includes a print instruction application 1045, a RAM 1046, an image memory 1047, an operation panel 1048, and a FAX function unit 1049.

The network I/F unit 1041 is an interface unit that processes the communication with the document providing system server 103. The job ticket/document analyzing unit 1044 conducts analysis of image data that the scanner 1042 has imported and printing jobs (document files, job tickets, variable page information, etc.) that the job ticket/document analyzing unit 1044 has received from the network I/F unit 1041. The print engine 1043 performs a control to print the printing jobs that the job ticket/document analyzing unit 1044 has analyzed on paper by an ink-jet process or laser-beam process or the like. The RAM 1046 is a volatile memory that stores for a while the printing jobs in their outputting process. The image memory (HDD) 1047 stores the printing jobs. The operation panel 1048 displays a list of document information and document file for users, and has a user interface function that accepts various instructions from users including selection of document file to be printed and print execution instructions.

The printing instruction application 1045 manages the execution of printing in accordance with printing instructions from the operation panel 1048, and the processing status of the printing jobs that have been received via the network I/F unit 1041. In addition, since the processing of the image data that the scanner 1042 has read out and the image data that the FAX function unit 1049 has received are included in the jobs, the printing instruction application 1045 manages also the processing status of their jobs.

Further, the communication between the network I/F 1041 and the printing device side I/F 1035 is desired to perform the processing of encryption (HTTPS/IPsec/PPTP/L2TP, etc.) for the purpose of security protection.

The management client 105 includes a management application 1051. The management application 1051 performs the user management in conjunction with the user management unit 1034 in the document providing system server 103.

Up to this point the configuration of the printing system according to the present embodiment has been described.

<Document Information>

Next, document information created and managed by the document information management unit 1032 will be described in detail.

FIG. 15 is a view illustrating an example of a document information management table stored in the document information management unit 1032.

In the document information management table, document IDs, document names, registered user IDs, job tickets, document file reference information, variable page information are registered, and associated with one another.

The document ID is an identifier assigned on document-by-document basis. The registered user ID is an identifier assigned to a user who has registered a document. Document file reference information is information for referring to the document file that is managed in association with the document information. The variable page information is information indicating whether or not respective pages in a document are variable pages. Also note that, this example is a configuration in which the document file is managed apart from the document information, but it may be a configuration in which the document file is retained in the document information. Further, it may be a configuration in which a job ticket is included in the variable page information.

<Variable Page Information>

FIG. 16 is a view illustrating an example of variable page information created by the form creation unit 1022, stored in the document information management unit 1032.

The variable page information includes a variable/non-variable field that indicates whether or not each page is a variable page. According to this variable page information, it can be found that the 2nd page and the 4th page of a document are variable pages, while the other pages are non-variable pages.

<User Information>

FIG. 17 is a view illustrating an example of the user information management table stored in the user management unit 1034.

In the user information management table, a user ID for identifying a user, a login ID, a login password, a job ticket for user are registered, which are associated with one another. The job ticket for user is used when a user wishes to print in a different setting from the setting described in the job ticket that is managed in association with the document file.

<Job Ticket>

FIG. 19 is a view illustrating an example of a job ticket analyzed by the job ticket/document analyzing unit 1044.

The job ticket adopts a text document format that utilizes a markup language, such as SGML, XML, or the like. However, what is illustrated in the figure describes only necessary portions for the description of the present embodiment, so it does not strictly comply with specifications of, such as SGML, XML and the like. Hereinafter, the descriptive contents of the job ticket will be described.

The job ticket consists of 19 lines. The first line of the job ticket, <JobTicket> represents the start of description of the job ticket. As a counterpart representation, the 19th line of the job ticket, </JobTicket> represents the end of description of the job ticket. The description from the 2nd line to 18th line of the job ticket represents concrete instructions. In a tag of the 2nd hierarchy of the 2nd line of the job ticket, a process name performed by the printing device 104 is described. The job ticket/document analyzing unit 1044 controls the printing device 104 to process in the order from a tag of the 2nd hierarchy of the job ticket. On the other hand, in a tag of the 3rd hierarchy of the job ticket, setting parameters of each processing are described. For example, lines 3rd to 5th of the job ticket represent "a document to be printed". The printing instructions application 1045 identifies a document to be printed based on the parameters. Lines 6th to 8th of the job ticket represent page numbers to be printed, lines 9th to 11th sizes of print sheets, lines 12th to 14th printing method (binding printing, single-sided printing, both-sided printing, etc.), lines 15th to 17th line color mode (color, monochrome). In other words, in this job ticket, print setting information that "perform color printing and binding operation in A4 size sheets for pages from 1st to 8th of a document with the file name of Original.doc" is described.

FIG. 20 is a view illustrating an example of a job ticket containing variable page information.

In the job ticket, a PrintPage that represents pages to be printed intends to refer to variable page information. The other descriptions are the same as those in the job ticket as illustrated in FIG. 19.

<Field Data Information>

FIG. 21 is a view illustrating an example of a field data information management table stored in a form data management unit 1021.

In the field data information management table, field data IDs and field data are registered, which are associated with each other.

<Form>

Figure 22:
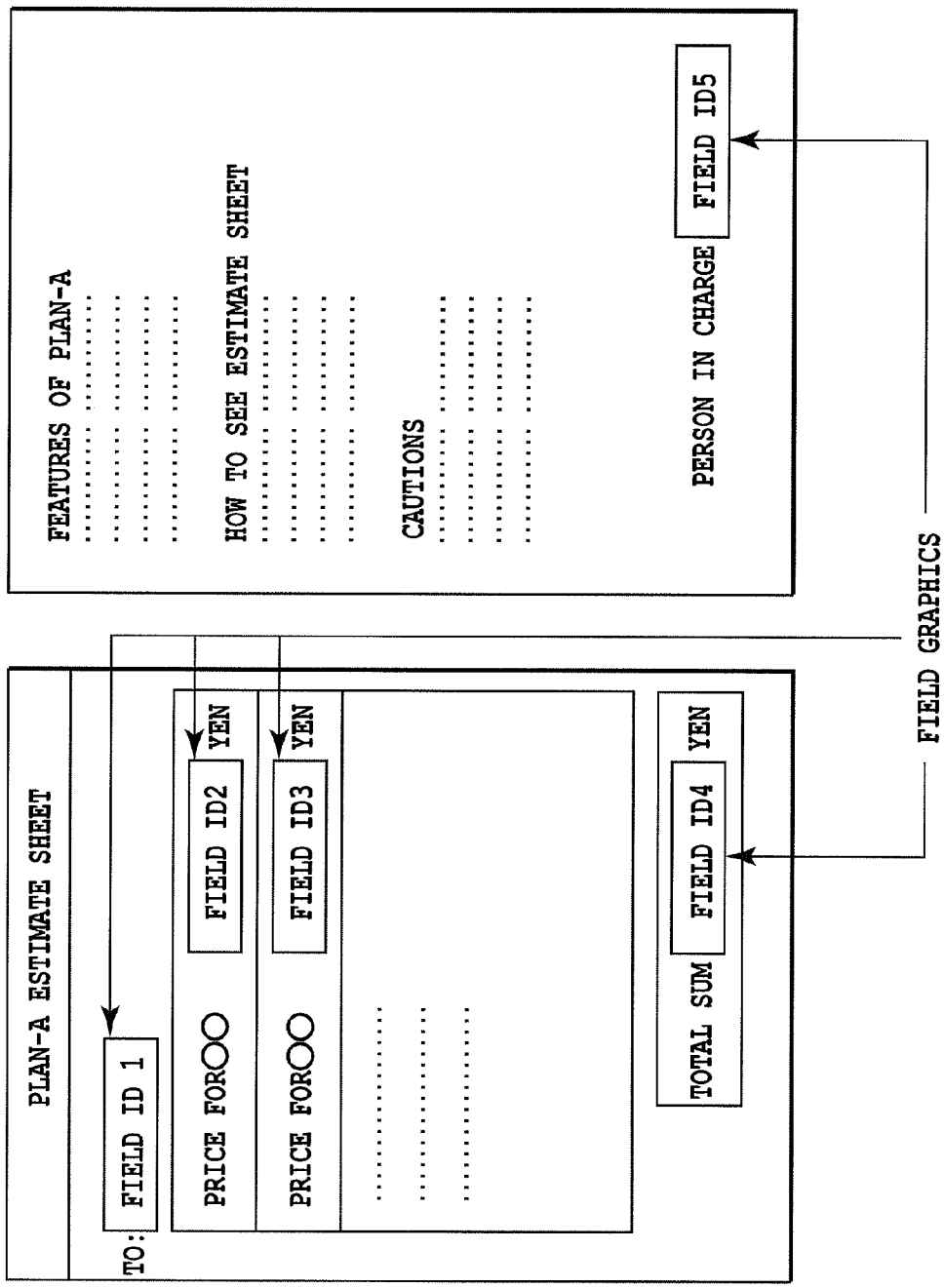
FIG. 22 is a view illustrating an example of a form template managed by the form data management unit.
Figure 24:
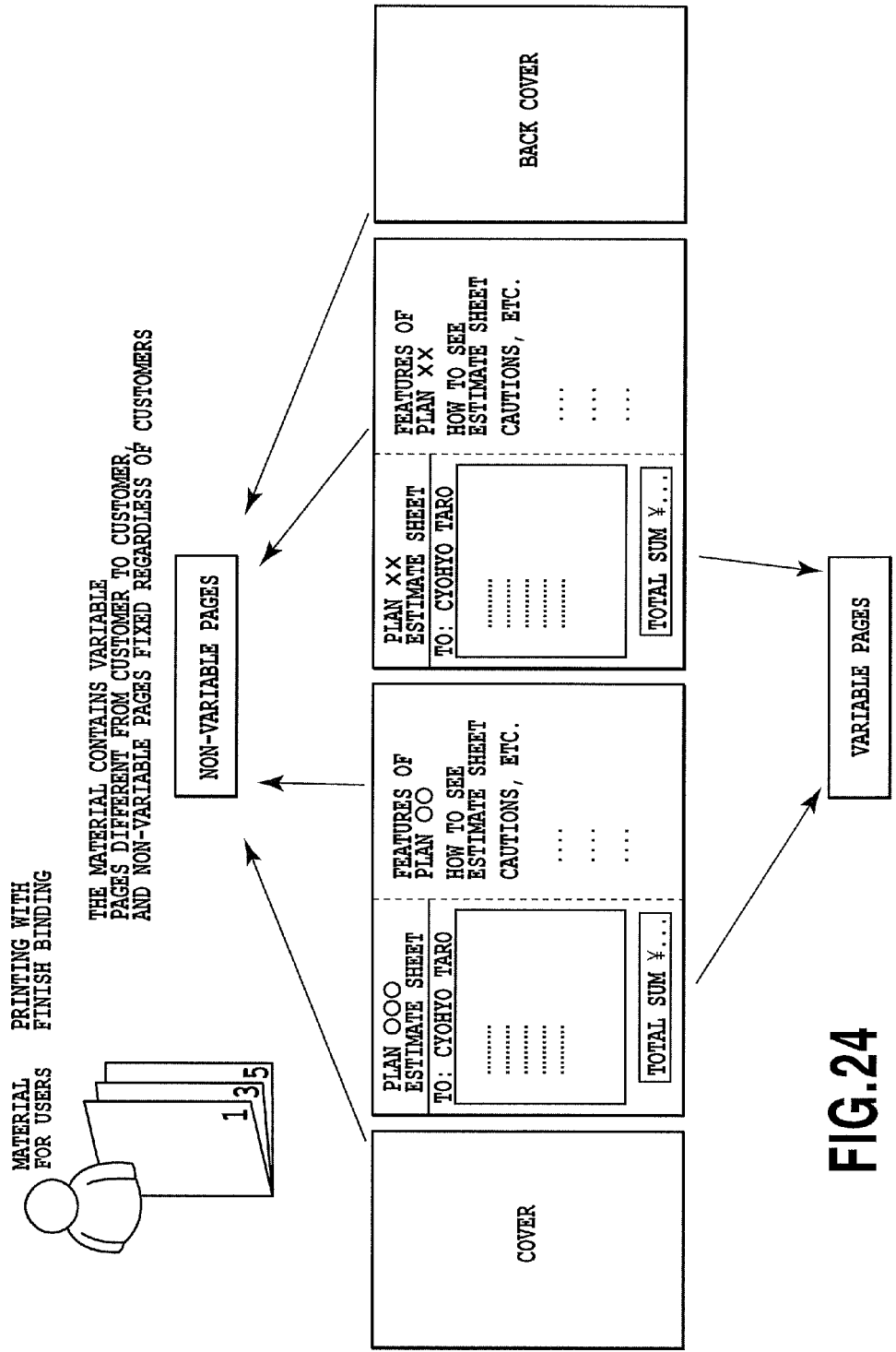
FIG. 24 is a view illustrating an example of estimate sheets for insurance salespersons.
Figure 25:
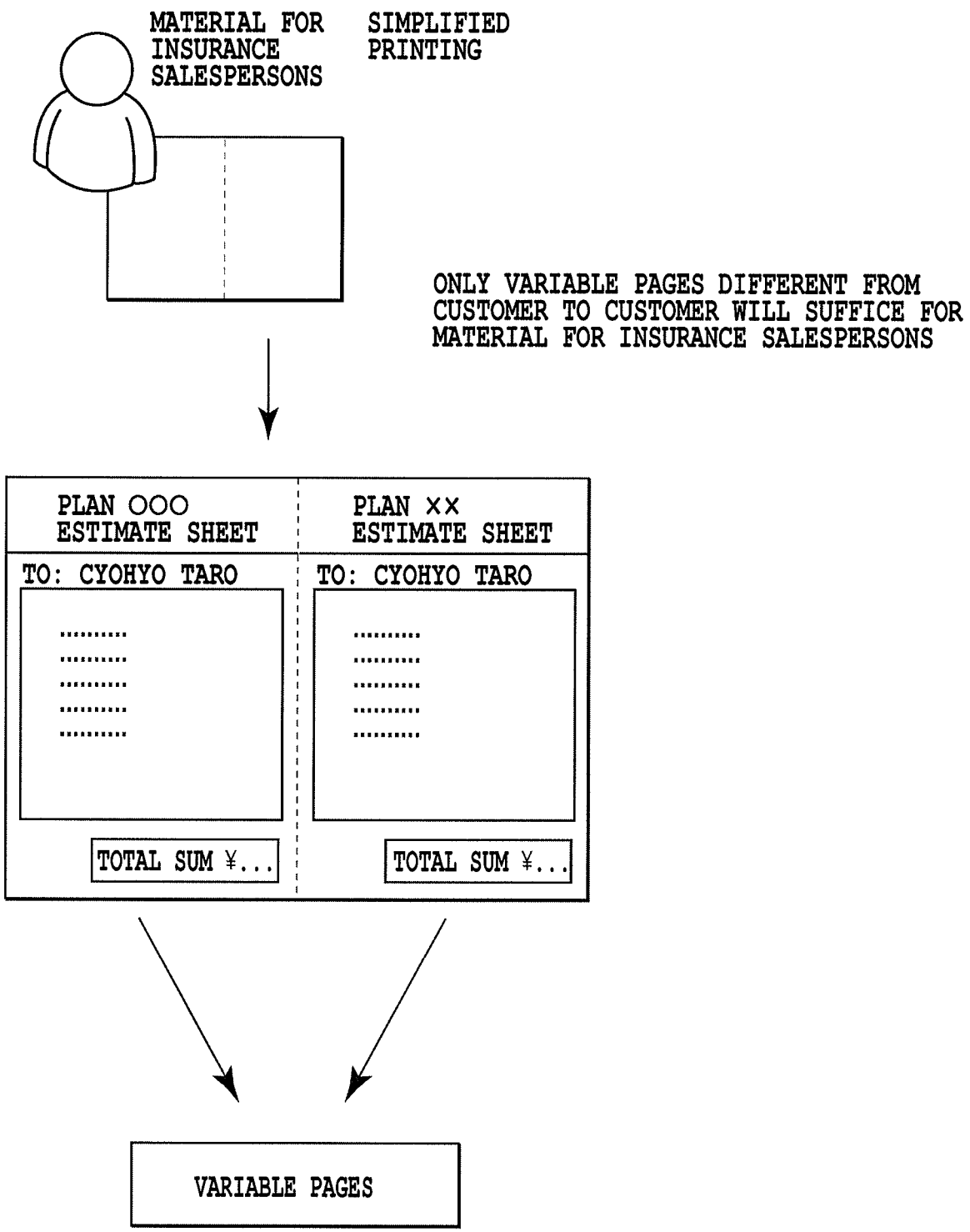
FIG. 25 is a view illustrating an example of estimate sheets for insurance salespersons.
Figure 26:
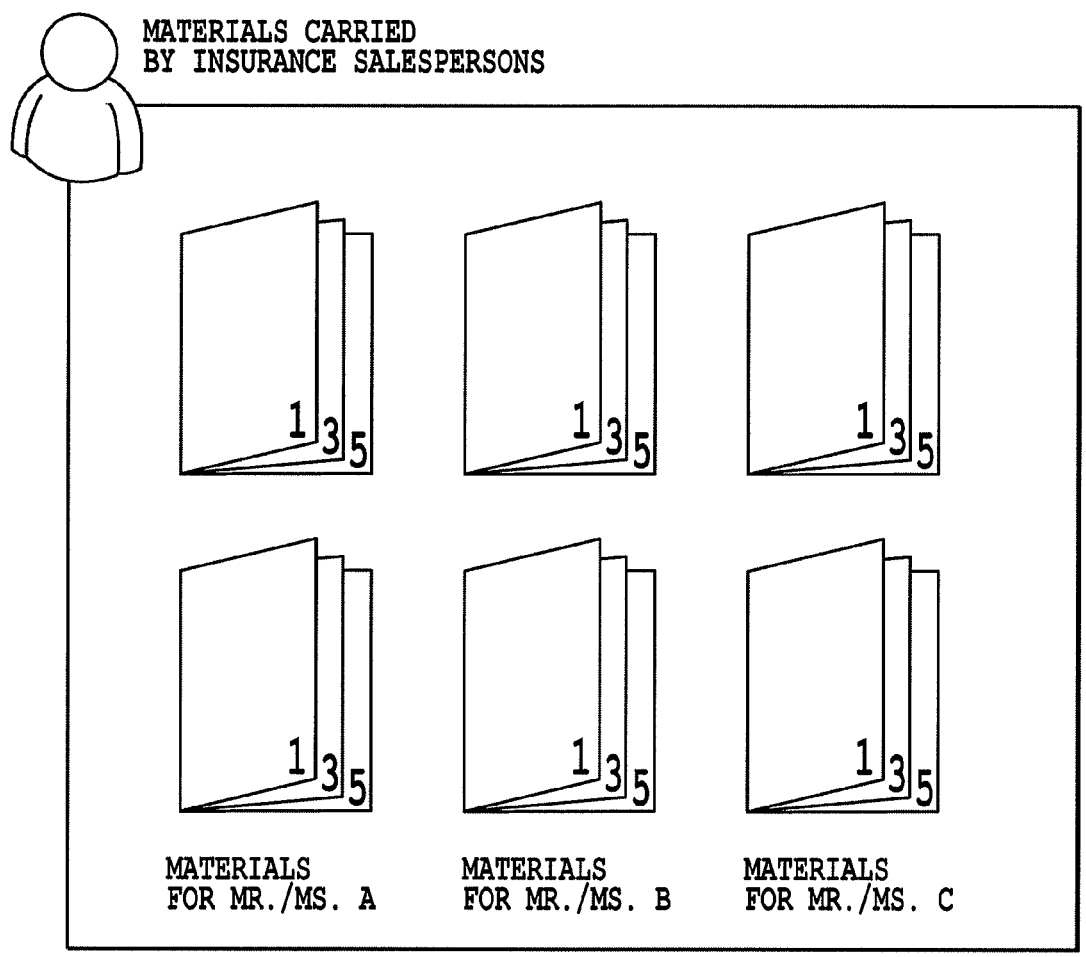
FIG. 26 is a view illustrating an example of estimate sheets for insurance salespersons.
Figure 27:
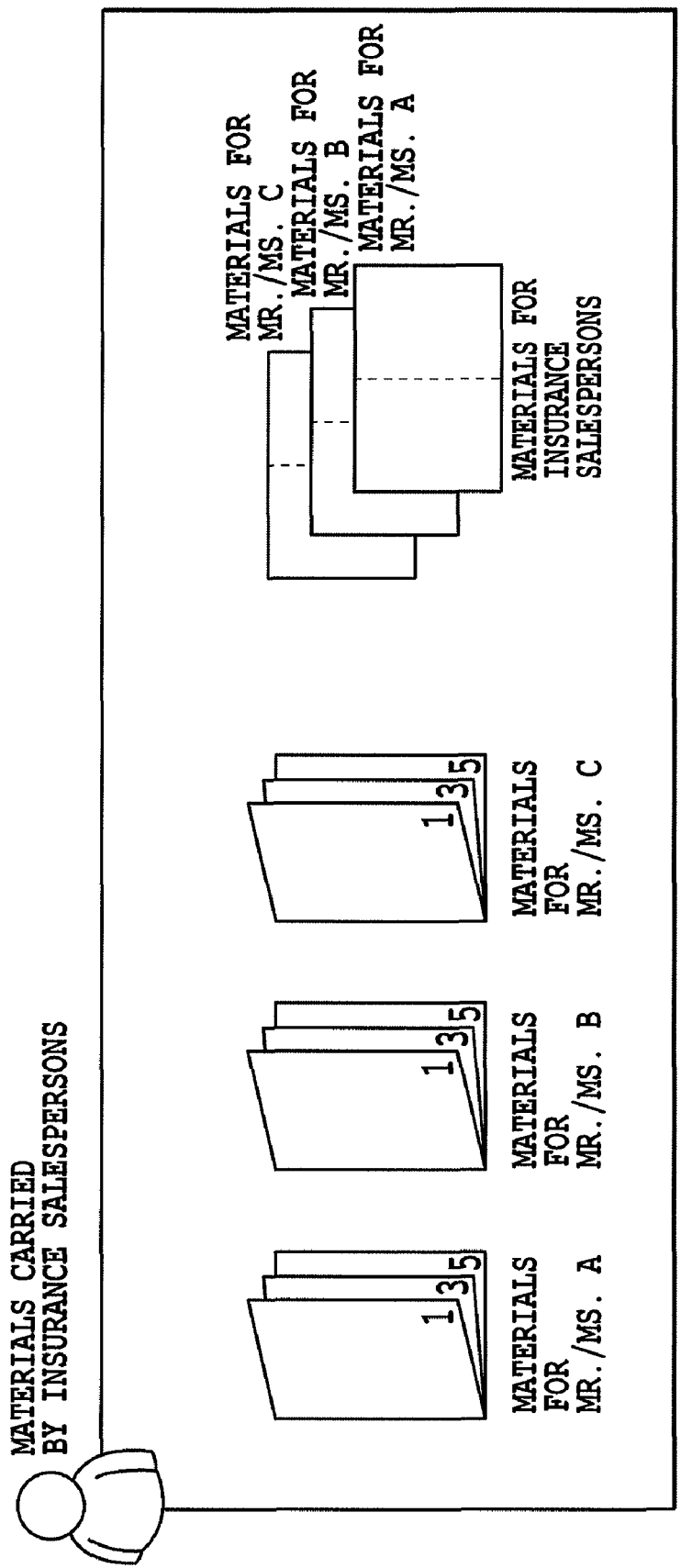
FIG. 27 is a view illustrating an example of estimate sheets for insurance salespersons.
Figure 28:
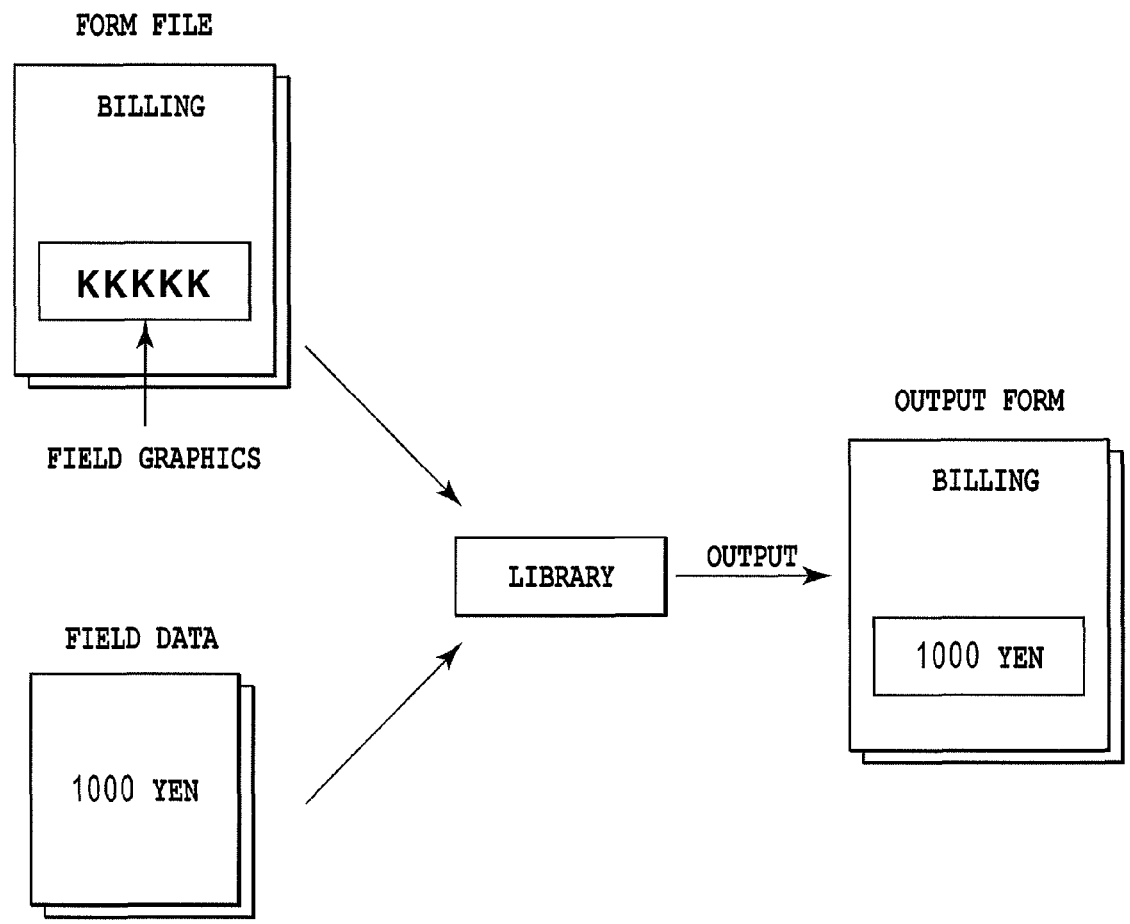
FIG. 28 is a schematic diagram illustrating a method of creating an output form from a form file and field data.

FIG. 22 is a view illustrating an example of a form template managed by the form data management unit 1021. The form template is equivalent to a form file as illustrated in FIG. 28.

The form template is comprised of field graphics into which variable field data is inserted, and all other fixed data. A field data ID is added to each of the field graphics.

FIG. 23 is a view illustrating an example of a form created by the form creation unit 1022.

The form is generated by inserting field data corresponding to a field ID in the region of the field graphics of the form template as illustrated in FIG. 22. That is, "Yamada Taro", "2000", "14000", "15200", and "SHIMOMARUKO HANAKO" are inserted into each region of field ID1, ID2, ID3, ID4, ID5 in FIG. 22, respectively. As a result, the form as illustrated in FIG. 23 is generated.

<User Management>

Next, user management by the management client 105 will be described.

A user who performs user management operates a management application 1051 of the management client 105, and gets access to a user management unit 1034 of the document providing system server 103.

Figure 18:
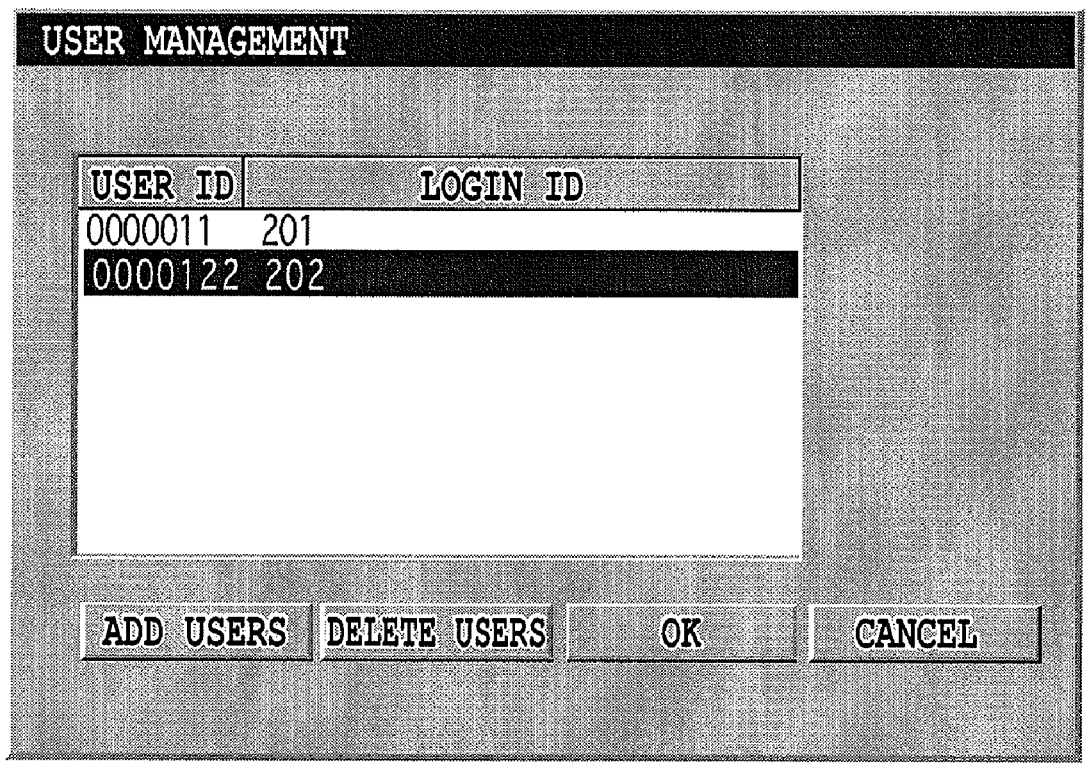
FIG. 18 is a view illustrating an example of a dialog box for user management.

FIG. 18 is a view illustrating an example of a dialog box for user management.

The user list that is registered at present is displayed in the dialog box for user management. When selecting users on the list, the detailed information of the user is further displayed on another dialog box, to allow the user to make various settings. In the user list, a user ID and a login ID as illustrated in FIG. 17 are displayed. The user performs addition or deletion of users by clicking the buttons for user addition, user deletion, and the like.

A user management unit 1034 sets a login password for each user ID, when performing a user addition process, and generates a job ticket for user for each user, and manages them in association with each other.

Also note that, a user may register a job ticket for user after having logged in to the printing device 104 via the operation panel 1048 of the printing device 104.

<Form Creation Process>

Next, a form creation process by a form creation unit 1022 of the document creation/registration client 102 will be described.

Figure 8:
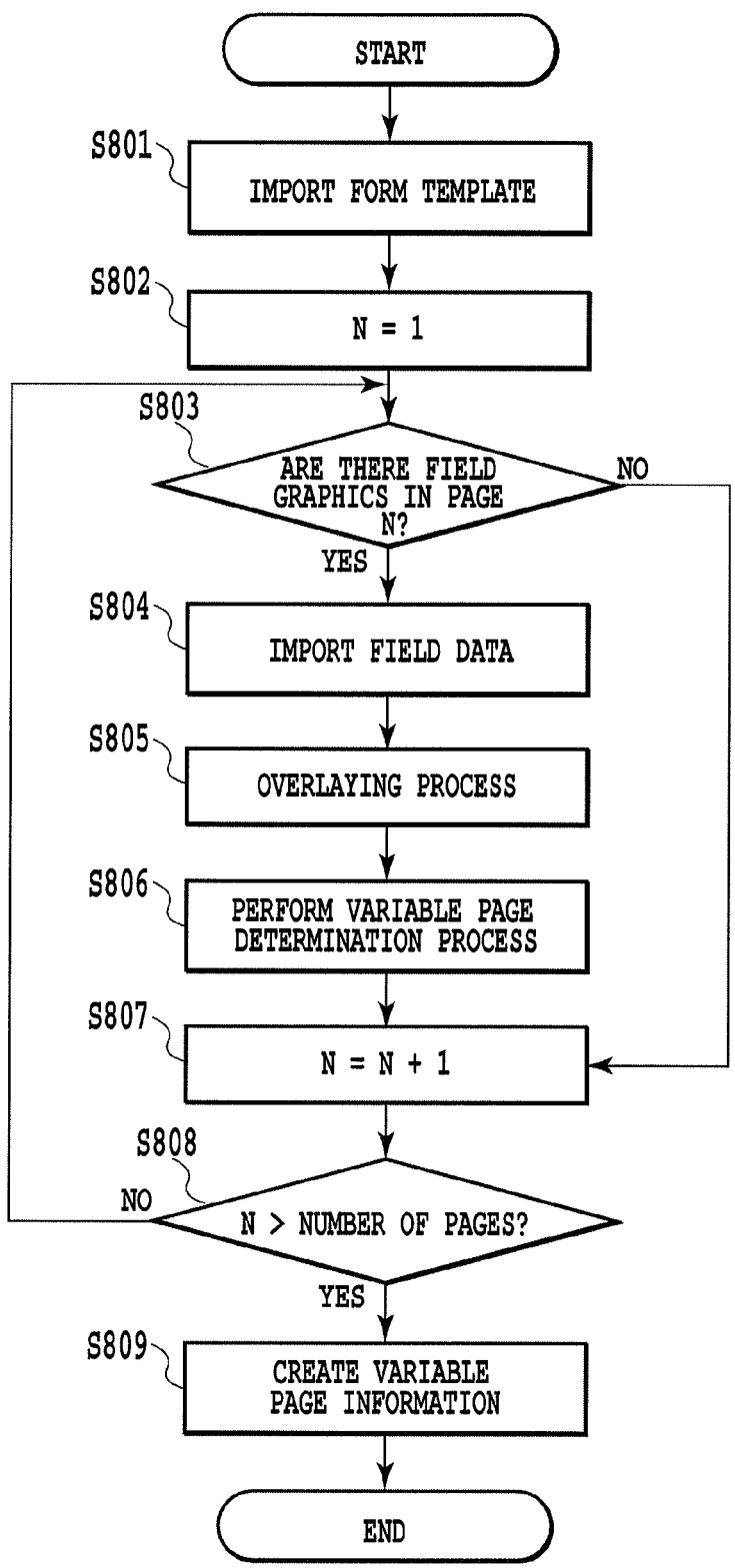
FIG. 8 is a flowchart illustrating a flow of form creation process by a form creation unit.

FIG. 8 is a flowchart illustrating a flow of a form creation process by the form creation unit 1022.

A user, who creates a form, designates a form template and field data of the form to be created using the document creation/registration client 102, and then starts the form creation process.

In step S801, the form creation unit 1022 imports the form template designated by the user from the form data management unit 1021.

In steps S802, S803, the form creation unit 1022 determines whether or not field graphics exist on the 1st page of the form template. If field graphics exist, the process proceeds to step S804, and if not exist, the process proceeds to step S807.

In step S804, the form creation unit 1022 imports field data from the form data management unit 1021.

In step S805, the form creation unit 1022 creates page data of the 1st page by performing an overlaying process to insert the field data of the field ID of the form template into the region of the field graphics.

In step S806, the form creation unit 1022 determines whether or not the 1st page is a variable page. For example, even if only a piece of field data exists within the page, it is determined as a variable page. If the 1st page is determined as a variable page, the form creation unit 1022 stores for a while the information that the 1st page is a variable page in a memory within the document creation/registration client 102. On the other hand, if the 1st page is determined as not a variable page, the form creation unit 1022 temporarily stores in a memory the information that the 1st page is non-variable page.

The form creation unit 1022 performs the processes of steps S803 to S806 for all pages of the form, and on completion of these processes, the process proceeds to step S809.

In step S809, the form creation unit 1022 creates variable page information as illustrated in FIG. 16 based on the information for each page that has been temporarily stored in a memory.

A form data management unit 1021 stores variable page information and form document in association with each other.

<Document Registration Process>

Next, a document registration process by the document creation/registration client 102 will be described.

FIGS. 3 to 7 are views for describing the procedure for the document registration process by the document creation/registration client 102. These views are screen examples displayed in WEB browser 1023 of the document creation/registration client 102, particularly, menu screens and the like that prompt users to make various inputs.

A user activates the WEB browser 1023 of the document creation/registration client 102, and gets access to a client side I/F unit 1031 of the document providing system server 103. When the user gets access to the client side I/F unit 1031, a menu selection form is returned from the document providing system server 103, and a menu screen will be displayed in the WEB browser 1023.

Figure 3:
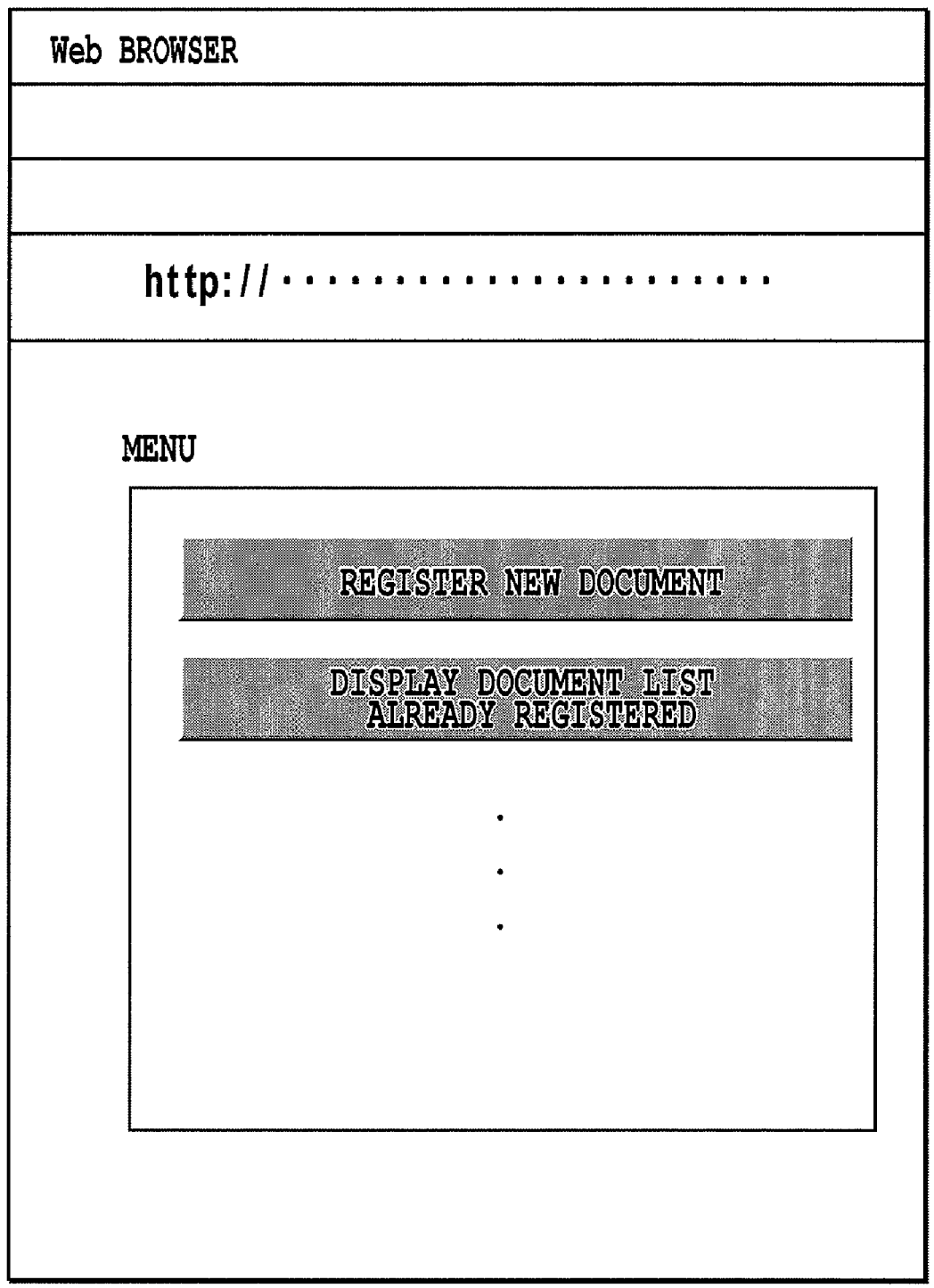
FIG. 3 is a view illustrating an example of a menu screen displayed in a WEB browser.

FIG. 3 is a view illustrating an example of the menu screen displayed in the WEB browser 1023.

In the menu, for example, two kinds of options are displayed; "Register a New Document" and "Display a Document List Already Registered". Here, when a user selects "Register a New Document" out of the menu, the selected information will be sent to the client side I/F unit 1031. Subsequently, the client side I/F unit 1031 sends a login screen form back to the document creation/registration client 102, and the login screen will be displayed in the WEB browser 1023.

Figure 4:
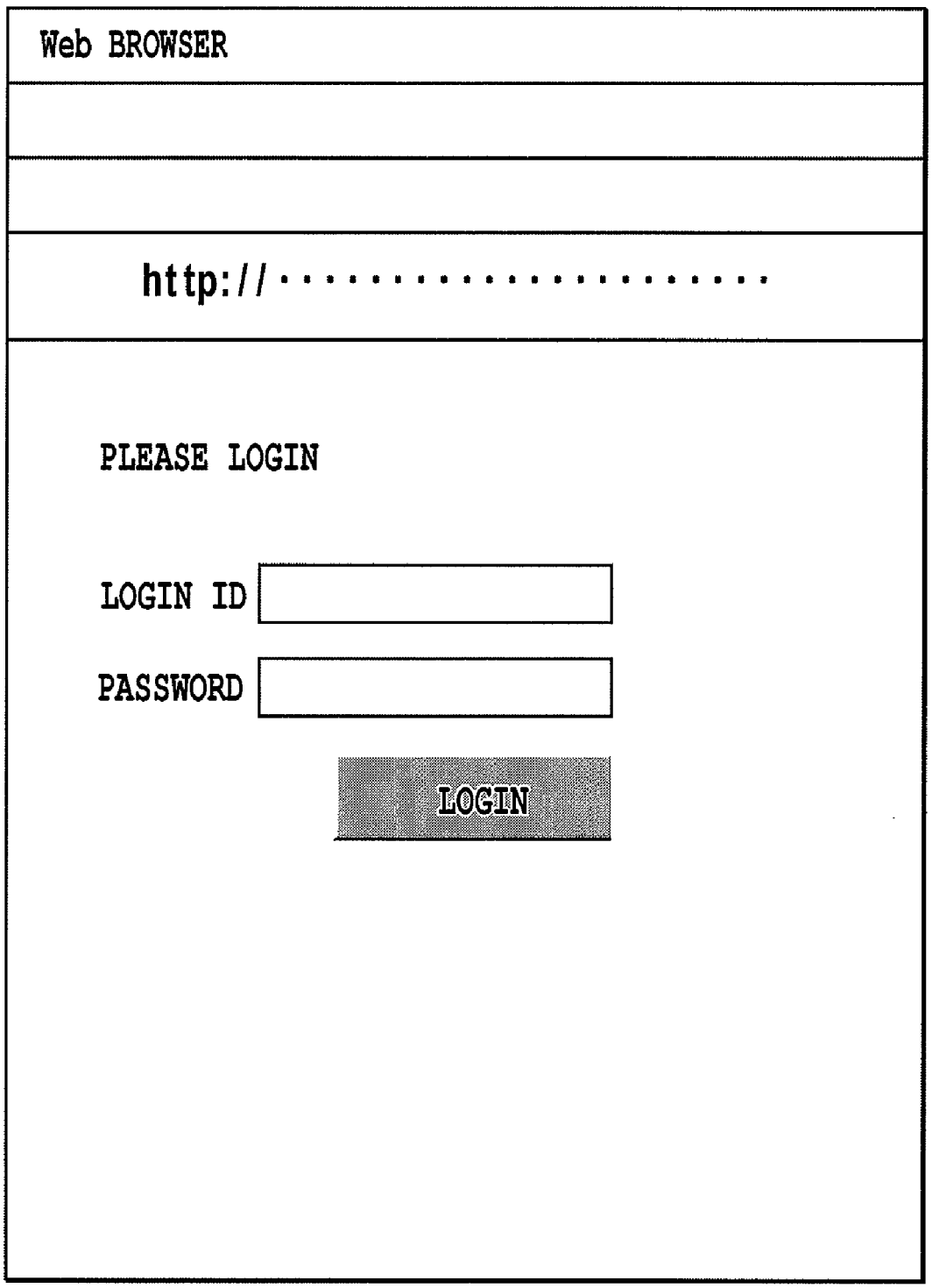
FIG. 4 is a view illustrating an example of a login screen displayed in a WEB browser.

FIG. 4 is a view illustrating an example of the login screen displayed in the WEB browser 1023.

On the screen, when a user inputs his or her login ID and password, and clicks "Login" button, the login information is sent to the client side I/F unit 1031. The client side I/F unit 1031 sends the received login information to the user management unit 1034. The user management unit 1034 makes user authentication based on the received login information, and sends the result of the authentication back to the client side I/F unit 1031. When the result of having made authentication confirms that a user is among users registered in the system, the document information management unit 1032 sends a registered document designation form back to the WEB browser 1023.

Figure 5:
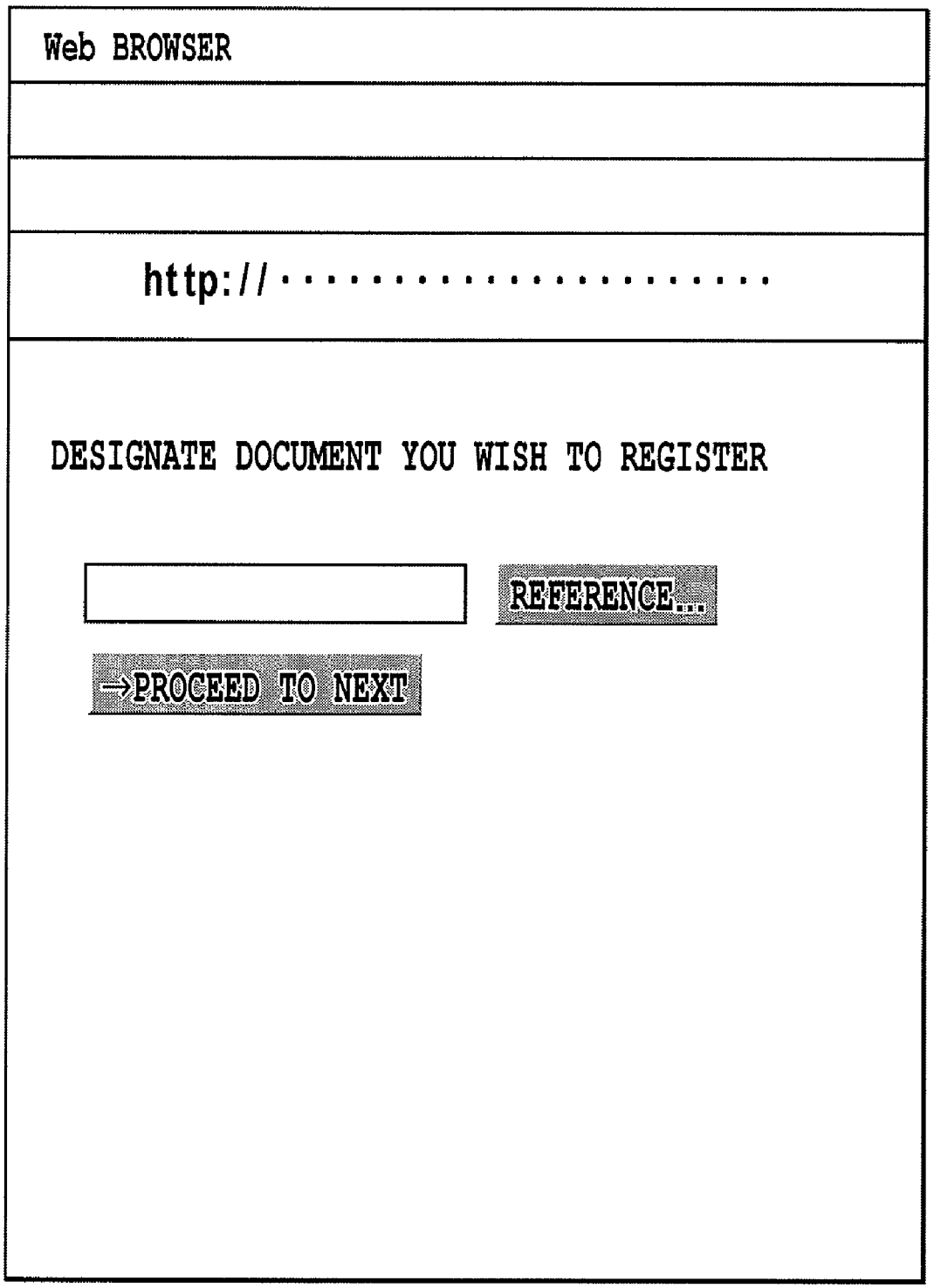
FIG. 5 is a view illustrating an example of a registered document designation screen displayed in a WEB browser.

FIG. 5 is a view illustrating an example of the registered document designation screen displayed in the WEB browser 1023.

When a user designates a document file name of a document scheduled for registration in a blank part on the screen, and clicks "Proceeds to Next" button, the designated document file is sent to the client side I/F unit 1031. At this time, the form data management unit 1021 sends also variable page information (FIG. 16) stored in association with the designated document file.

The client side I/F unit 1031 sends the received document file, variable page information to the document information management unit 1032.

The document information management unit 1032 stores the received document file, variable page information in a memory.

Next, the client side I/F unit 1031 sends a document attribute information designation form back to the WEB browser 1023.

FIG. 6 is a view illustrating an example of the document attribute information designation screen displayed in the WEB browser 1023.

On the screen, a user designates a print setting (document attribute information) when printing a document. The print setting contents include print sizes (A3, A4 etc.), print side (single-sided/both-sided), page layout, color/monochrome printing, and the like. Further, print setting, "change in style when printing shall not be permitted" is selectable. In this case, printing will be performed in a print style that has been already designated upon registration of the document. In addition, it is also possible to set a password for the document for purpose of security protection of the document. When the password is set for the document, the document will be encrypted and stored in the document providing system server 103. When printing the encrypted document, a user enters his or her password, and only when a correct password is entered, the printing will be permitted. When printing, the printing device 104 decrypts the document in accordance with the entered password and performs print processing.

When a user designates a print setting, and clicks "Proceed to Next Step" button, the designated print setting is sent to the client side I/F unit 1031.

The client side I/F unit 1031 creates document information, and sends it to the document information management unit 1032 along with the user's user ID that is being logged in.

The document information management unit 1032 stores user ID of the user who has registered a document, document information, variable page information, and document file in association with one another, and further issues a document ID to send it back to the client side I/F unit 1031.

Next, the client side I/F unit 1031 creates a document ID notification form including the document ID, and sends them back to WEB browser 1023.

Figure 7:
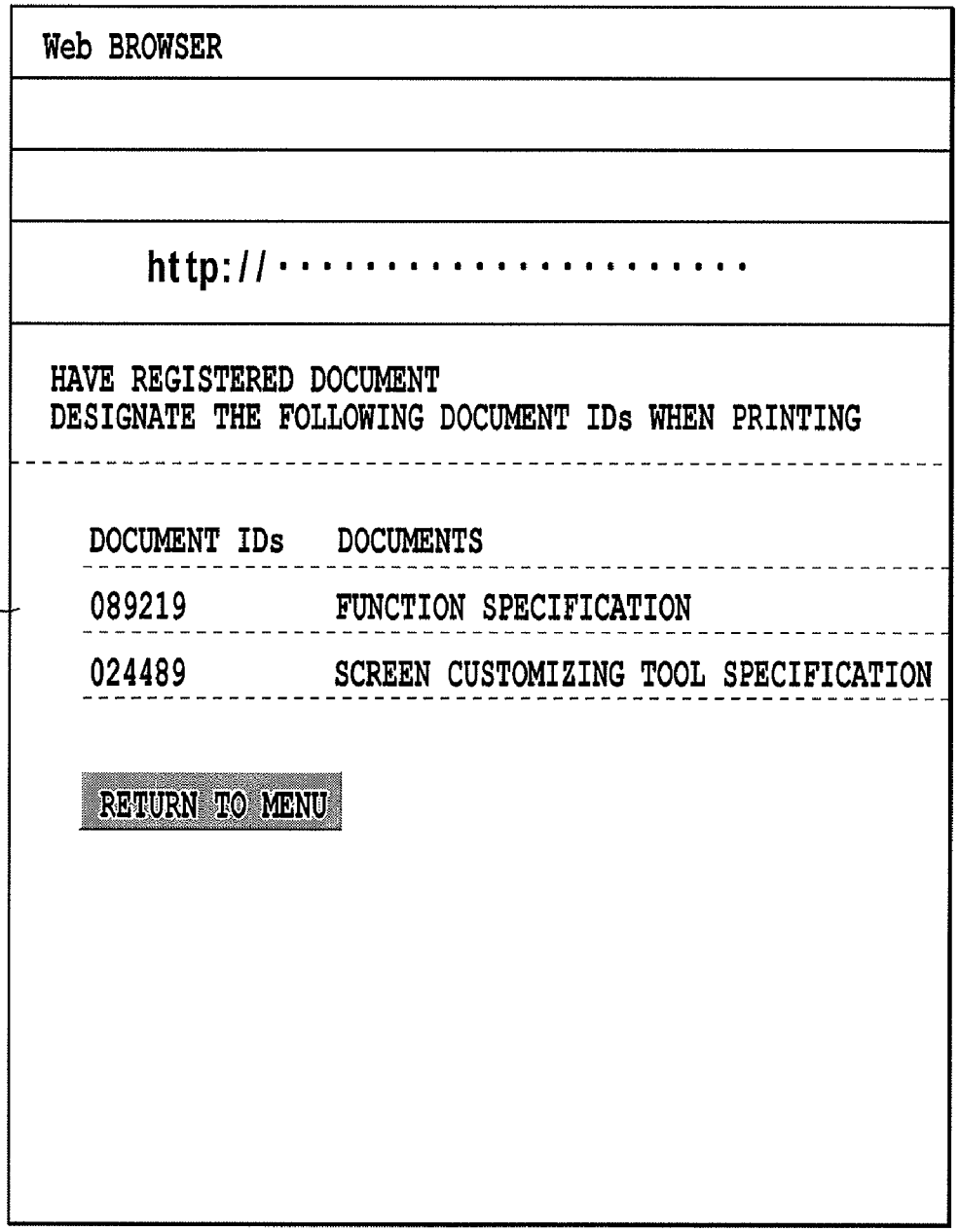
FIG. 7 is a view illustrating an example of a document ID notification screen displayed in a WEB browser.

FIG. 7 is a view illustrating an example of a document ID notification screen displayed in the WEB browser 1023.

A user uses a document ID displayed on the document ID notification screen when printing the document.

The description up to this point is the procedure for the document registration processing by the document creation/registration client 102.

<Document Printing Process>

Next, a flow of the document printing process by the printing device 104 and the document providing system server 103 will be described.

A user activates a printing instruction application 1045 from the operation panel 1048 of the printing device 104 to perform document print request.

When the printing instruction application 1045 is activated, a login screen is displayed on the operation panel 1048.

Figure 12:
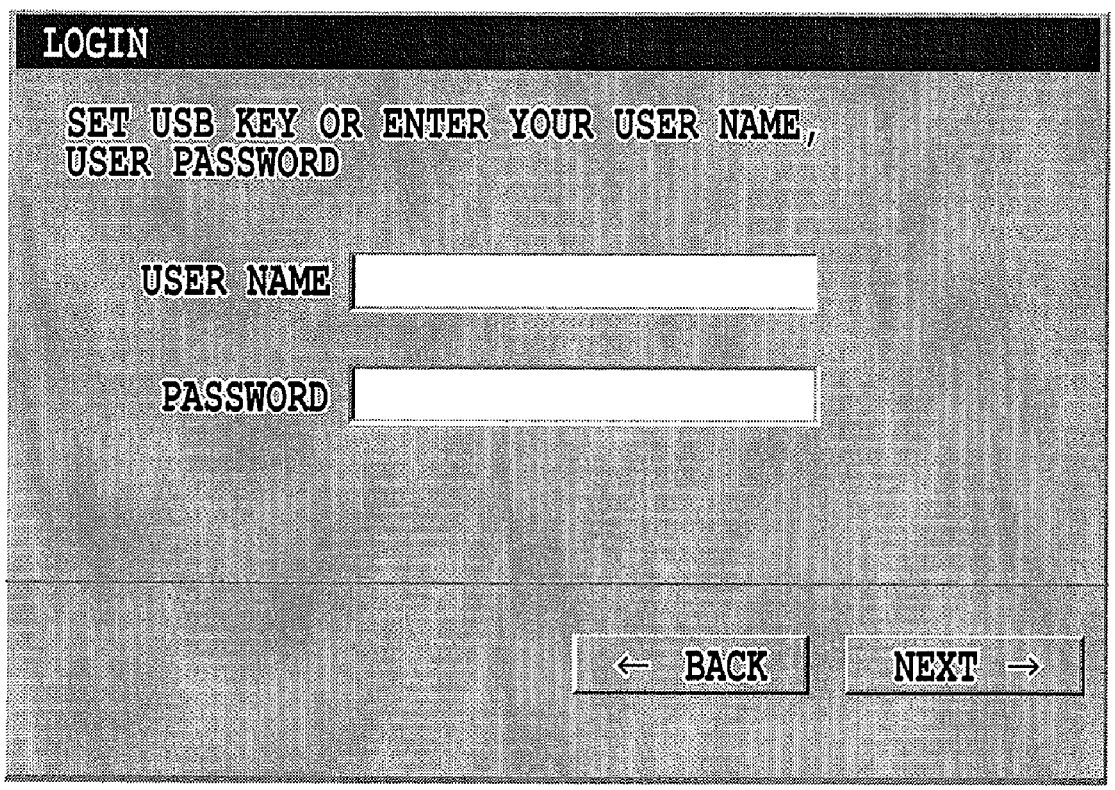
FIG. 12 is a view illustrating an example of a login screen displayed on an operation panel.

FIG. 12 is a view illustrating an example of a login screen displayed on the operation panel 1048.

When a user enters his or her user's ID (user's name) and password from the login screen, the printing instruction application 1045 sends the user's ID and password to the printing device side I/F unit 1035 of the document providing system server 103. The printing device side I/F unit 1035 sends the received user's ID and password to the document information management unit 1032.

The document information management unit 1032 sends the received user ID and password to the user management unit 1034, and requests user's authentication. The user management unit 1034 that has received a user authentication request, retrieves the user information associated with the user ID, and authenticates that the user is the one registered in the printing system and password is correct. The user management unit 1034 determines a user who has logged in to be a valid user if the user ID and password are correct, and permits his or her login, otherwise displays again a login screen on the operation panel 1048.

If the user who has logged in is determined to be a valid user, the document information management unit 1032 retrieves a document already registered, creates a document list, and sends it to the printing device side I/F unit 1035.

The printing device side I/F unit 1035 sends a document list to a printing instruction application 1045, and the printing instruction application 1045 displays the document list on the operation panel 1048.

FIG. 13 is a view illustrating an example of a dialog box of a document list displayed on the operation panel 1048.

In the document list, there are included file names and dates of receipt of manuscript (dates of registration) of the registered documents.

A user designates a file name of a document to be printed for a document list. Note that the user may designate two or more documents at the same time. Further, the user clicks "Detailed Information" button, thereby the user can let the detailed information of each document to be displayed in another dialog box.

When clicking "Next" button after designating the document file in the dialog box, the printing instruction application 1045 displays a print mode selection dialog box on the operation panel 1048.

Figure 14:
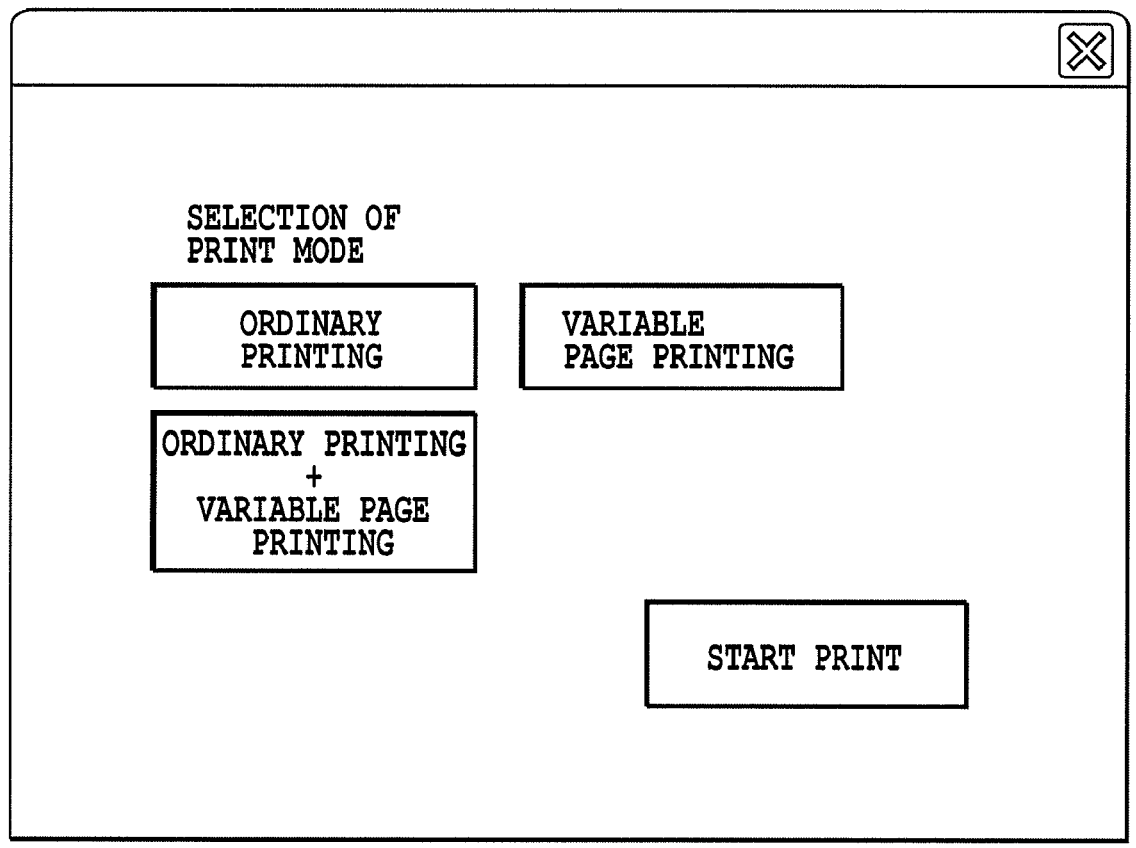
FIG. 14 is a view illustrating an example of print mode selection dialog box displayed on an operation panel.

FIG. 14 is a view illustrating an example of the print mode selection dialog box displayed on the operation panel 1048.

As print modes, three modes are available: "Ordinary Printing", "Variable Page Printing", "Ordinary Printing+Variable Page Printing". By "Ordinary Printing", we mean, for example, a mode to print document for customers. By "Variable Page Printing", we mean, for example, a mode to print documents for insurance salespersons. By "Ordinary Printing+Variable Page Printing", we mean, for example, a mode to print documents for customers and documents for insurance salespersons.

When a user selects a print mode and clicks "Start Print" button, the printing instruction application 1045 designates a document ID to the printing device side I/F unit 1035 and sends a document file acquiring request. The printing device side I/F unit 1035 that has received the document file acquiring request sends the document file acquiring request to the document information management unit 1032.

The document information management unit 1032 retrieves document information of a document associated with the designated document ID, acquires a registered user ID from the document information, and sends it to the user management unit 1034. The user management unit 1034 compares the registered user ID with the user ID currently being logged in, and if they match with each other the printing process will start.

Figure 9:
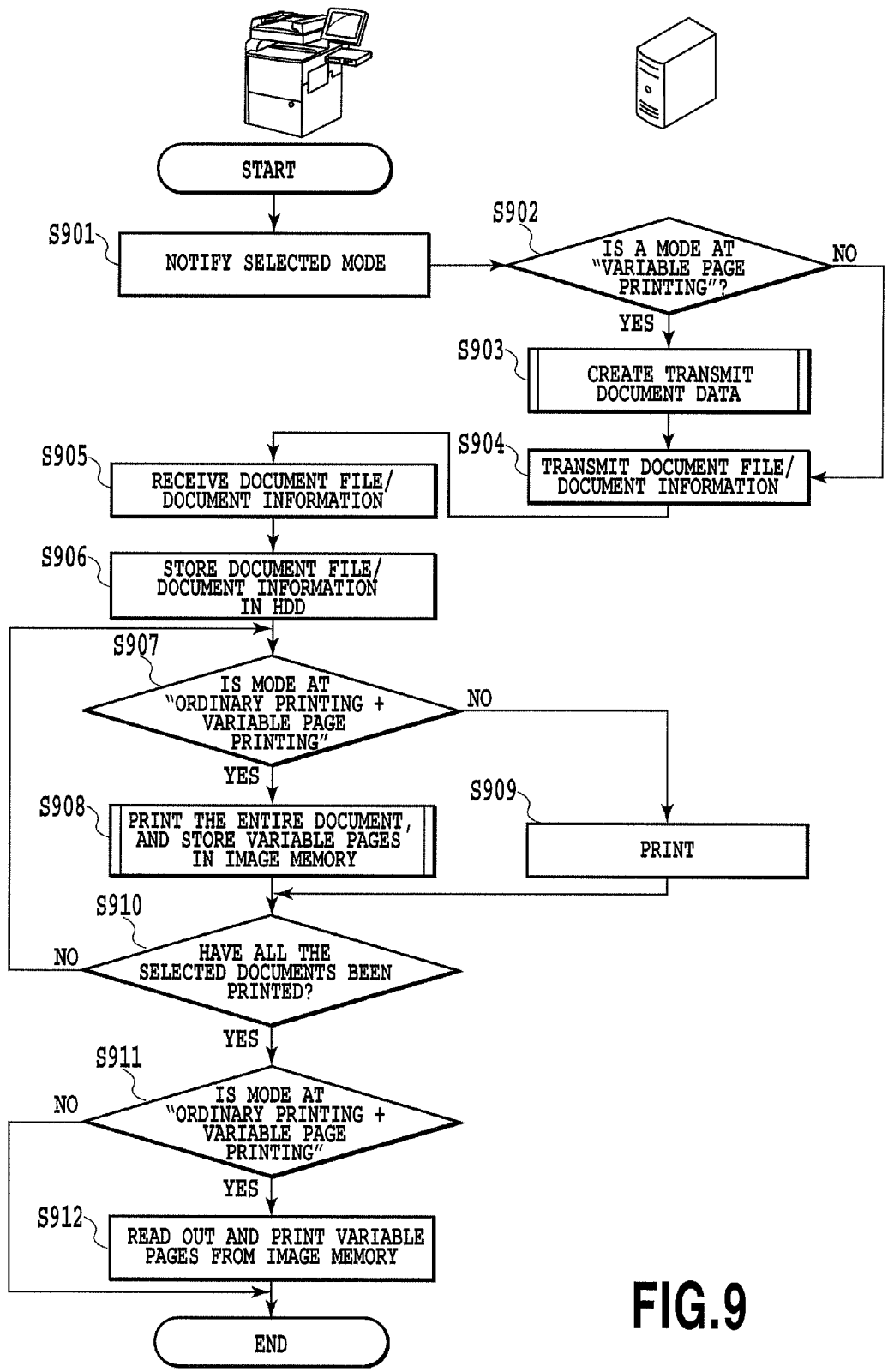
FIG. 9 is a flowchart illustrating a flow of a document printing process by a printing device and a document providing system server.

FIG. 9 is a flowchart illustrating a flow of a document printing process by the printing device 104 and the document providing system server 103.

In step S901, the printing instruction application 1045 sends a print mode that a user has selected on the operation panel 1048 to the document information management unit 1032.

In step S902, the document information management unit 1032 determines whether a printing mode is "Variable Page Printing" or "Ordinary Printing+Variable Page Printing" or "Ordinary Printing". If the mode is either "Variable Page Printing" or "Ordinary Printing+Variable Page Printing", the process proceeds to step S903, and if not, the process proceeds to step S904.

In step S903, the transmit data creation unit 1036 extracts only variable pages out of a document, and creates document data to be sent to the printing device 104.

Figure 10:
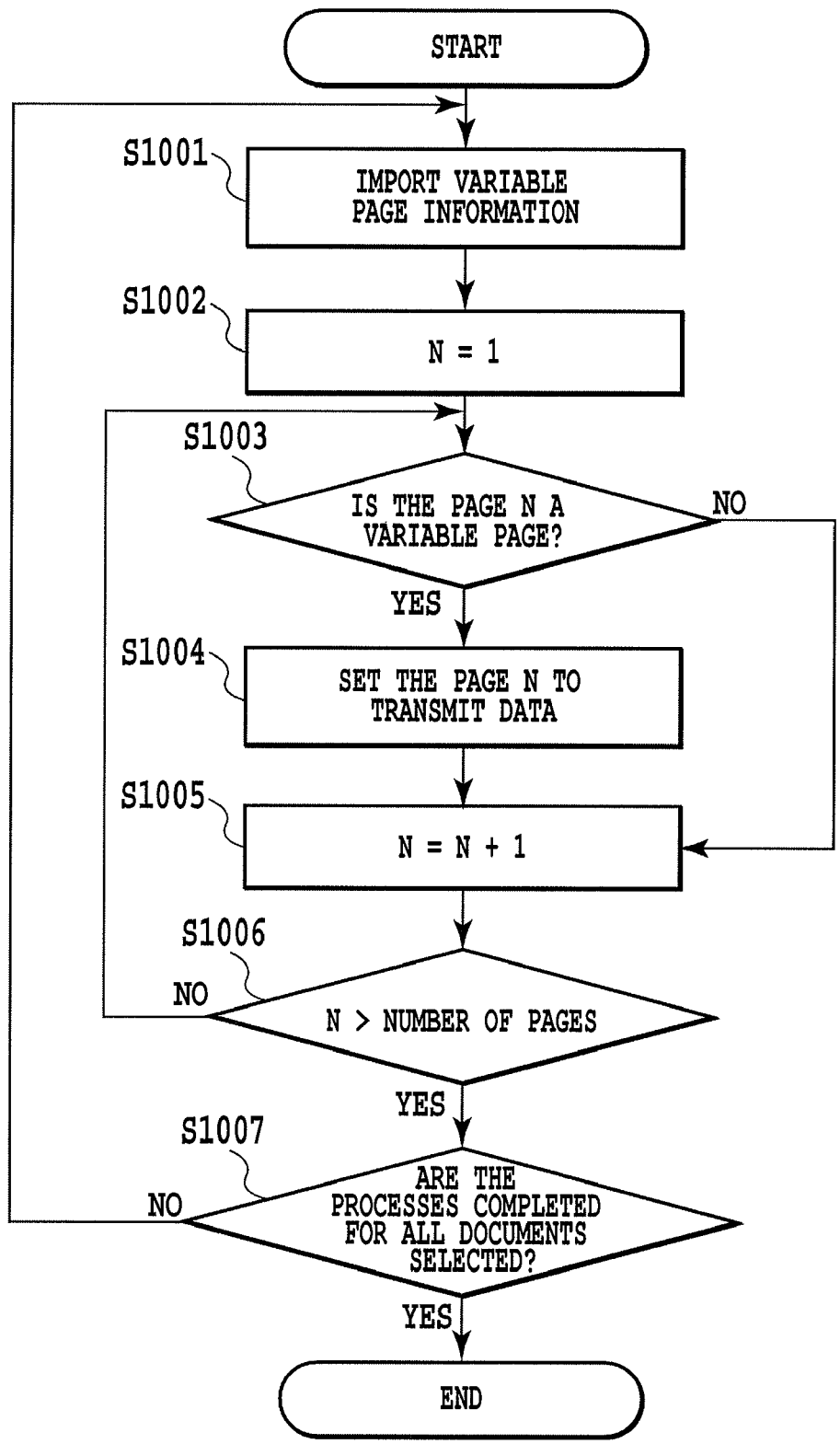
FIG. 10 is a flowchart illustrating in detail a flow of processing of S903 in FIG. 9.

FIG. 10 is a flowchart illustrating in detail a flow of the process of step S903.

In step S1001, the transmit data creation unit 1036 reads a content of variable page information (FIG. 16) regarding a document from the document information management unit 1032.

In steps S1002 to S1004, the transmit data creation unit 1036 determines whether or not the 1st page is variable page referring to a variable/non-variable data field of variable page information. If the 1st page is a variable page, the 1st page is set as a transmit data to be sent to the printing device 104.

The transmit data creation unit 1036 performs the same processing as the above-described processing for the 2nd or later pages of the document.

In step S1006, the transmit data creation unit 1036 determines whether or not the processes of steps S1003 to S1004 have been performed for all pages of the document.

In step S1007, the transmit data creation unit 1036 determines whether or not the processes of steps S1003 to S1004 have been performed for all the documents selected by a user.

Through the above processes, the transmit data creation unit 1036 sets variable pages contained in all the documents selected by a user as transmit data.

The above description is the details of a flow of the process of step S903.

Subsequently, returning to FIG. 9, a flow of document printing process by the printing device 104 and the document providing system server 103 will be described.

In step S904, when a print mode is "Variable Page Printing" or "Ordinary Printing+Variable Page Printing", the document information management unit 1032 sends printing data for variable pages created in step S1003 together with document information (FIG. 15) including a job ticket to the printing device 104. In addition, when a print mode is either "Ordinary Printing" or "Ordinary Printing+Variable Page Printing", the document information management unit 1032 sends all document files corresponding to printing data including variable pages and non-variable pages, which a user has selected on the document list (FIG. 13) together with document information including the job ticket to the printing device 104.

Thus, in present the embodiment, when a print mode is variable page printing, only variable pages rather than the entire document are transmitted to the printing device 104, so that transmit load of communication line can be reduced. In addition, when a print mode is variable page printing, non-variable pages are not printed, so that print capacity can be reduced.

In step S905, the printing instruction application 1045 receives document file and document information.

In step S906, the printing instruction application 1045 stores the received document file and document information in the image memory (HDD) 1047.

In step S907, the printing instruction application 1045 determines a printing mode, and if the printing mode is "Ordinary Printing+Variable Page Printing", the process proceeds to step S908, while if any other mode, the process proceeds to step S909.

In step S908, a job ticket/document analyzing unit 1044 analyzes a job ticket included in document information, converts the entire document to printer codes that a print engine 1043 can interpret using imposition information of a document, or the like, and sends them to the print engine 1043. The print engine 1043 that has received the printer codes controls to print the entire document on paper. In parallel therewith, the job ticket/document analyzing unit 1044 stores the data of variable pages converted to the printer codes in the image memory (HDD) 1047.

Figure 11:
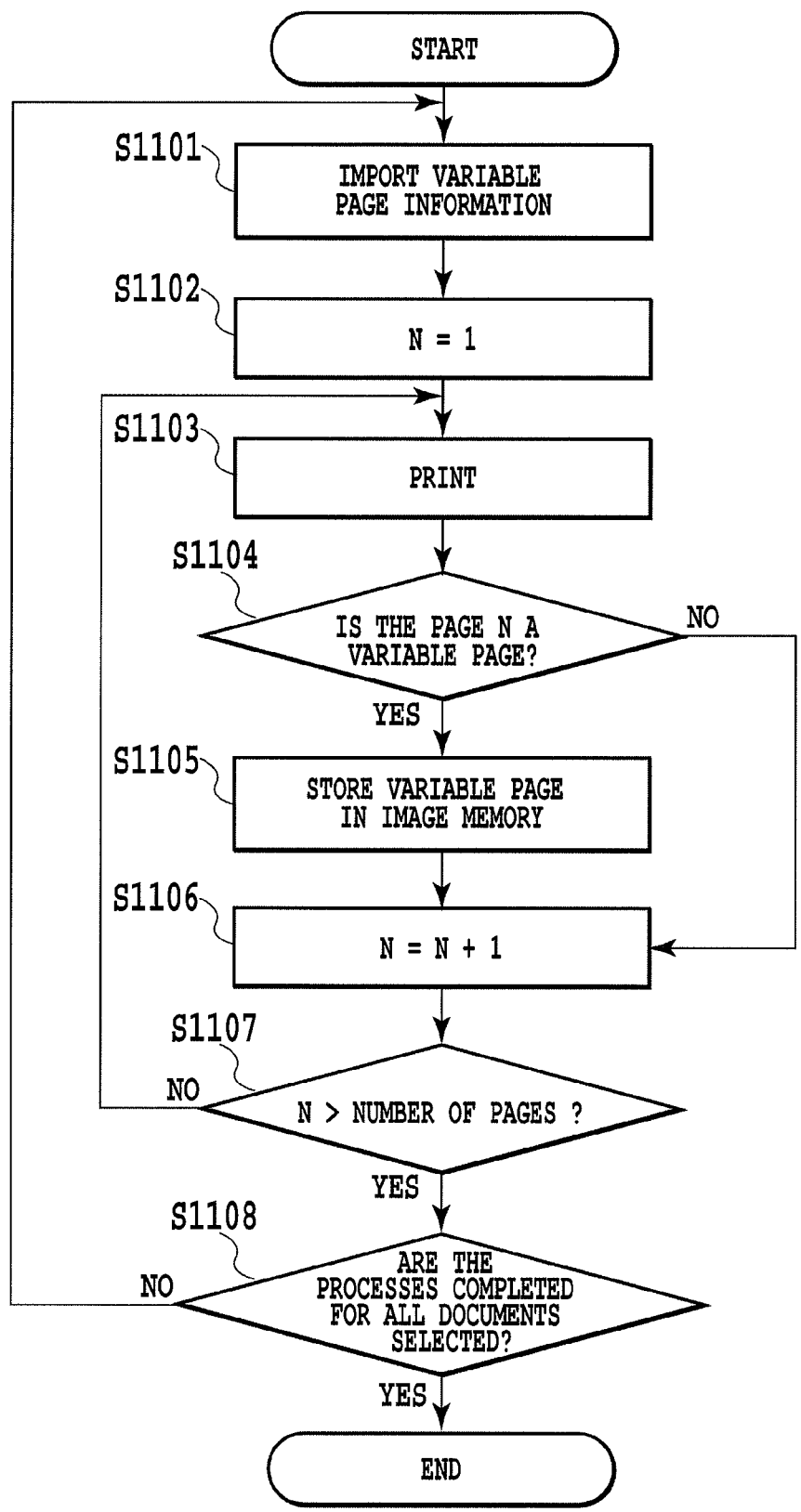
FIG. 11 is a flowchart illustrating in detail a flow of process of S908 in FIG. 9.

FIG. 11 is a flowchart illustrating in detail a flow of the process of S908.

In step S1101, the printing instruction application 1045 controls the job ticket/document analyzing unit 1044, and imports variable page information of the selected document.

In steps S1102, S1103, the printing instruction application 1045 analyzes the job ticket using imposition information, or the like of a document, and converts the 1st page of the document to the printer codes that the print engine 1043 can interpret, and send them to the print engine 1043. The print engine 1043 that has received the printer codes controls to print the entire document on sheets.

In step S1104, the printing instruction application 1045 determines whether or not the 1st page is a variable page referring to variable/non-variable data field of variable page information. And, when the 1st page is a variable page, the process proceeds to step S1105, and when the 1st page is a non-variable page, the process proceeds to step S1106.

In step S1105, the printing instruction application 1045 stores the data of variable pages converted to the printer codes in the image memory (HDD) 1047.

The printing instruction application 1045 performs the processes of steps S1103 to S1105 for all pages of the document (S1107).

The printing instruction application 1045 performs the processing of steps S1103 to S1105 for all documents that a user has selected (step S1108).

Through the above processes (step S908), the printing instruction application 1045 prints the entire document, as well as saving variable pages in the image memory.

The above-description is the details of a flow of the process of step S908.

Subsequently, returning to FIG. 9, a flow of document printing process by the printing device 104 and the document providing system server 103 will be described.

In step S909, the job ticket/document analyzing unit 1044 analyzes a job ticket using imposition information, or the like of a document, and converts the document to the printer codes that the print engine 1043 can interpret, and sends them to the print engine 1043. The print engine 1043 that has received the printer codes controls to print the entire document on paper. At this time, when a print mode is "Ordinary Printing", the print engine 1043 performs printing using a job ticket prepared for each document within the document information. Further, when a print mode is "Variable Page Printing", the print engine 1043 performs printing using the job ticket within the user information.

The printing instruction application 1045 performs the processes of steps S907 to S909 for all documents selected (S910).

In steps S911, S912, the printing instruction application 1045 prints the data of variable pages stored in the image memory (HDD) 1047 using a job ticket in the user information, if a print mode is "Ordinary Printing+Variable Printing".

The above-mentioned embodiment, the form creation unit 1022 of the document creation/registration client 102 determines as a variable page when even one of field data (variable data) exists in a page. However, there may be a case where it is not desirable to determine a page having field data but having only that field data as a variable data, which contains, for example, name of insurance salesperson, or the like. Thus, field data information as illustrated in FIG. 29 is used at a variable page determination process (step S806) as illustrated in FIG. 8. A field data level (importance) has been set in advance for each field ID of field data information as illustrated in FIG. 29, then whether or not variable page is determined based on the field data level. For example, when field data levels of the field data in a page have only "LOW", the page is determined as a non-variable page.

OTHER EXAMPLES

The present invention can assume embodiments of a system, a device, a method, a computer program or a computer-readable storage medium. Further, the present invention can be applied to a system or a device comprised of a plurality of pieces of equipment.

The embodiments of the present invention include providing a computer program for implementing the afore-mentioned functions of the invention via a storage medium or a network to a system or a device, and causing a computer, equipped in the system or in the device, to perform the program. The storage medium is a computer-readable storage medium. Therefore, a computer program itself that implements the functions of the present invention is included in the embodiments. The computer program includes an object code, a program executed by an interpreter, script data supplied to OS, etc. The storage medium includes floppy disc, hard disc, optical disc, magneto-optical disc, MO, CD-ROM, CD-R, CD-RW, magnetic tape, non-volatile memory card, ROM, DVD, etc. As a method for supplying a program, there is a method, for example, for downloading from Internet to a storage medium, such as hard disc, etc. using a browser of client's computer. In this method, a file of computer program, or, a file compressed and including automatic install function is downloaded from Internet. Further, the embodiments include segmenting program codes that constitute a computer program to a plurality of files, and downloading respective files from different servers. In addition, the embodiments include the servers that allow the files of the computer program to be downloaded to a plurality of users.

The functions of the afore-mentioned embodiments can be implemented by a computer that executes a computer program. Further, OS or the like operational on the computer performs a part or the whole of actual process based on the instructions of the computer program, so that the functions of the afore-mentioned embodiments can be implemented.

Even after a computer program having been read out from the storage medium has been written in a memory provided in a function expansion board inserted into a computer or a function expansion unit connected to a computer, the functions of afore-mentioned embodiments can be implemented. That is, CPU provided in a function expansion board or a function expansion unit performs a part or the whole of actual processing based on the instructions of the computer program, so that the functions of the afore-mentioned embodiments can be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-289956, filed Nov. 7, 2007, which is hereby incorporated by reference herein in its entirety.

What is claimed is:

1. An image processing device comprising:
a determining component constructed to determine whether a printing mode for printing a document is an ordinary printing and variable page printing mode; and
when the printing mode is determined by the determining component as the ordinary printing and variable page printing mode, the device comprises:
a printing component constructed to print the entire document;
a storing component constructed to store data of variable pages contained in the document; and
a reading and printing component constructed to read data of variable pages stored in the storing component after printing the entire document and print the read data.

2. The image processing device of claim 1, wherein the reading and printing component constructed to print data of the variable pages uses a job ticket within user information.

3. The image processing device of claim 1, wherein, when at least one variable data is present in a page of the document, the determining component determines the page as a variable page.

4. The image processing device of claim 1, wherein the determining component determines, based on importance set in advance to variable data in a page of the document, whether or not the page is a variable page.

5. An image processing method executed by an image processing apparatus, the method comprising the steps of:
determining whether a printing mode for printing a document is an ordinary printing and variable page printing mode; and when the printing mode is determined by the determining step as the ordinary printing and variable page printing mode, the method comprises the steps of:

printing the entire document;

storing data of variable pages contained in the document; and reading and printing data of variable pages stored in the storing step after printing the entire document.

6. A non-transitory computer readable storage medium on which is stored computer-executable code that, when executed by a processor, causes the computer to perform the steps of:

determining whether a printing mode for printing a document is an ordinary printing and variable page printing mode; and when the printing mode is determined by the determining step as the ordinary printing and variable page printing mode, the method comprises the steps of:

printing the entire document;

storing data of variable pages contained in the document; and reading and printing data of variable pages stored in the storing step after printing the entire document.

* * * * *